US008547660B2

(12) United States Patent  (10) Patent No.: US 8,547,660 B2
Allen et al.  (45) Date of Patent: Oct. 1, 2013

(54) MAGNETIC WRITE HEAD MANUFACTURED BY AN ENHANCED DAMASCENE PROCESS PRODUCING A TAPERED WRITE POLE WITH A NON-MAGNETIC SPACER AND NON-MAGNETIC BUMP

(75) Inventors: Donald G. Allen, Morgan Hill, CA (US); Amanda Baer, Campbell, CA (US); Yingjian Chen, Fremont, CA (US); Andrew Chiu, San Jose, CA (US); Liubo Hong, San Jose, CA (US); Wen-Chien D. Hsiao, San Jose, CA (US); Edward H. P. Lee, San Jose, CA (US); Fenglin Liu, Milpitas, CA (US); Aron Pentek, San Jose, CA (US); Katalin Pentek, San Jose, CA (US); Kyusik Shin, Pleasanton, CA (US); Yi Zheng, San Ramon, CA (US); Qiping Zhong, San Jose, CA (US); Honglin Zhu, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 656 days.

(21) Appl. No.: 12/641,251

(22) Filed: Dec. 17, 2009

(65) Prior Publication Data
US 2011/0151279 A1  Jun. 23, 2011

(51) Int. Cl.
*G11B 5/127* (2006.01)
(52) U.S. Cl.
USPC ............ 360/125.13; 360/125.14; 360/125.15
(58) Field of Classification Search
USPC ........................ 360/125.08, 125.12–125.15
See application file for complete search history.

(56) References Cited

U.S. PATENT DOCUMENTS

| 7,159,302 | B2 | 1/2007 | Feldbaum et al. | 29/603.12 |
|---|---|---|---|---|
| 7,305,753 | B2 | 12/2007 | Kobayashi | 29/603.16 |
| 7,375,925 | B2 * | 5/2008 | Sasaki et al. | 360/123.02 |
| 8,031,433 | B2 * | 10/2011 | Yan et al. | 360/125.03 |
| 2004/0233578 | A1 * | 11/2004 | Gao | 360/125 |
| 2007/0211377 | A1 | 9/2007 | Sasaki et al. | 360/126 |
| 2008/0024911 | A1 * | 1/2008 | Sasaki et al. | 360/110 |
| 2008/0112081 | A1 | 5/2008 | Matono | 360/125.08 |
| 2008/0278855 | A1 | 11/2008 | Guthrie et al. | 360/236.5 |
| 2008/0316653 | A1 * | 12/2008 | Sasaki et al. | 360/319 |
| 2009/0021868 | A1 | 1/2009 | Takano et al. | 360/315 |
| 2009/0052094 | A1 | 2/2009 | Otani et al. | 360/319 |
| 2009/0122445 | A1 * | 5/2009 | Jiang et al. | 360/123.12 |
| 2009/0141406 | A1 * | 6/2009 | Sasaki et al. | 360/319 |

(Continued)

FOREIGN PATENT DOCUMENTS
JP  2007/257711  10/2007

*Primary Examiner* — Will J Klimowicz
*Assistant Examiner* — Carlos E Garcia
(74) *Attorney, Agent, or Firm* — Zilka-Kotab, PC

(57) ABSTRACT

A magnetic write head having a tapered trailing edge and having a magnetic layer formed over a trailing edge of the write pole at a location recessed from the ABS, the magnetic layer being separated from the trailing edge of the write pole by a thin non-magnetic layer. The thin non-magnetic layer is preferably sufficiently thin that the magnetic layer can function as a portion of the write pole in a region removed from the ABS. A trailing magnetic shield is formed over the write pole and is separated from the write pole by a non-magnetic trailing gap layer. A non-magnetic spacer layer can be formed over the magnetic layer to provide additional separation between the magnetic layer and the trailing magnetic shield.

6 Claims, 57 Drawing Sheets

(56) References Cited

U.S. PATENT DOCUMENTS

| | | | |
|---|---|---|---|
| 2009/0144966 A1 | 6/2009 | Zheng | 29/603.18 |
| 2009/0154021 A1 | 6/2009 | Nunokawa et al. | 360/234.3 |
| 2010/0172054 A1* | 7/2010 | Yamaguchi et al. | 360/125.03 |

* cited by examiner

MAGNETIC WRITE HEAD MANUFACTURED BY AN ENHANCED DAMASCENE PROCESS PRODUCING A TAPERED WRITE POLE WITH A NON-MAGNETIC SPACER AND NON-MAGNETIC BUMP

FIELD OF THE INVENTION

The present invention relates to magnetic heads for data recording, and more particularly to a method for manufacturing a perpendicular magnetic write head having a tapered write pole, an additional magnetic layer over the write pole and a non-magnetic bump for optimal trailing shield spacing.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soil underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded. It is desirable to maximize both of these parameters, while also ensuring that the magnetic write pole does not become magnetically saturated at the pole tip.

SUMMARY OF THE INVENTION

The present invention provides a magnetic write head having a tapered trailing edge and having a magnetic layer formed over the trailing edge of the write pole at a location recessed from the ABS, the magnetic layer being separated from the trailing edge of the write pole by a thin non-magnetic layer. The thin non-Magnetic layer is preferably sufficiently thin that the magnetic layer can function as a portion of the write pole in a region removed from the ABS. A trailing magnetic shield is formed over the write pole and is separated from the write pole by a non-magnetic trailing gap layer. A non-magnetic spacer layer can be formed over the magnetic layer to provide additional separation between the magnetic layer and the trailing magnetic shield.

The write pole can also be configured with a tapered leading edge, and a leading magnetic shield can also be provided. If a leading magnetic shield is provided, it can be separated from the write pole by a leading gap distance that is significantly larger than the distance between the write pole and the trailing magnetic shield.

The leading edge of the write pole can also be configured with a tapered portion near the air bearing surface. This tapered leading edge can be used to further improve the focusing of magnetic flux into the pole tip region of the write pole.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
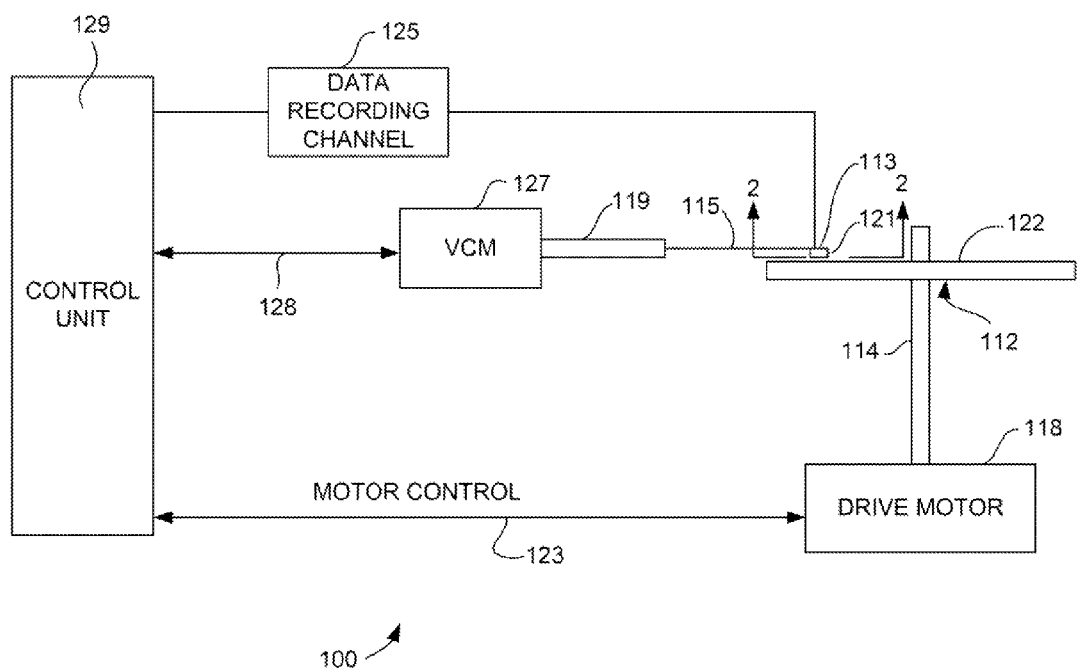
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
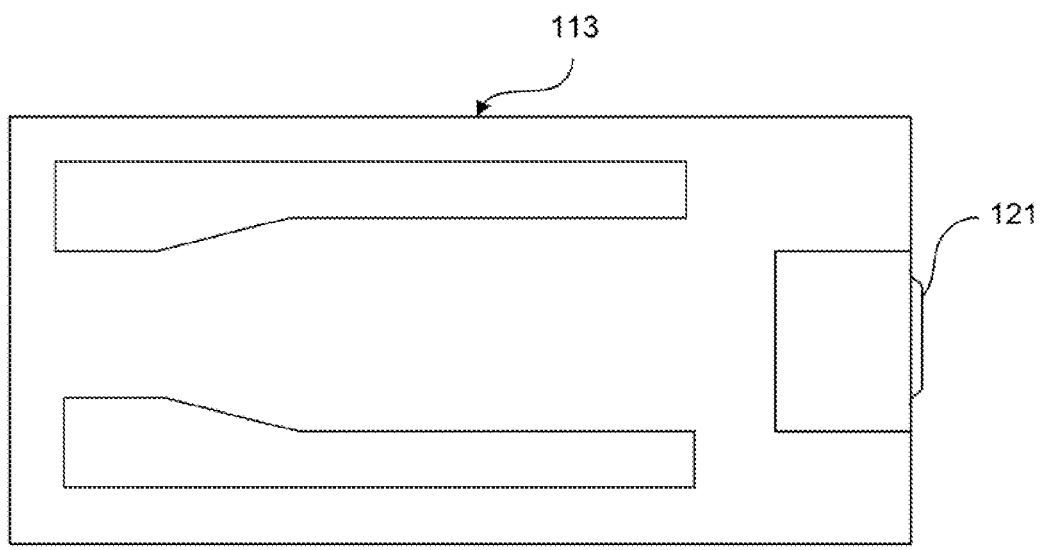
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
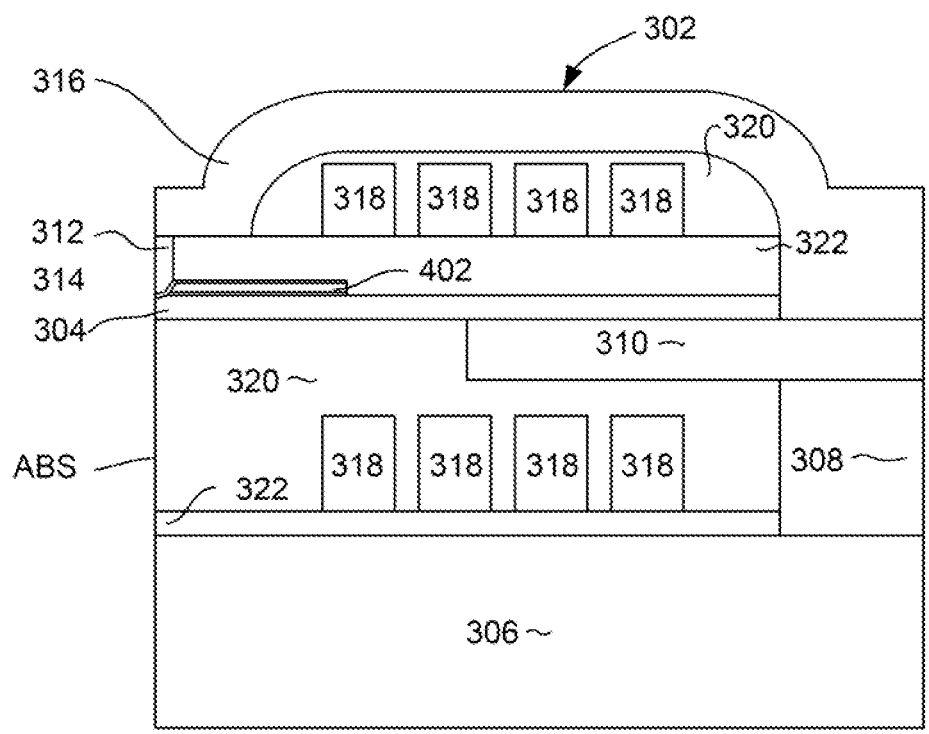
FIG. 3 is a cross sectional view of a magnetic write head according to an embodiment of the present invention.

With reference now to FIG. 3, the invention can be embodied in a magnetic head 302 having a tapered write pole and a non-magnetic bump. The magnetic write head 302 includes a magnetic write pole 304 and a magnetic return pole 306. A magnetic back gap layer 308 and magnetic shaping layer 310 magnetically connect the return ole 306 with the write pole 304 at a location removed from an air bearing surface ABS.

An electrically conductive, non-magnetic write coil 318 passes between the write pole 304 and return pole 306 and may also pass above the write pole 304. The write coil 318 can sit on top of a non-magnetic, electrically insulating material 322 and is also embedded in a non-magnetic, electrically insulating material 320 such as alumina and or hard baked photoresist.

During operation, an electrical current flowing through the coil 318 induces a magnetic field the results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby increase switching speed), the write head 302 also includes a magnetic trailing shield 312. This trailing shield 312 is separated from the write pole 304 by a non-magnetic trailing gap layer 402. The write pole 312 may also be connected with a trailing return pole 316 that connects the trailing shield 312 with the back portion of the write head 302, such as the back portion of the shaping layer 310.

Figure 4:
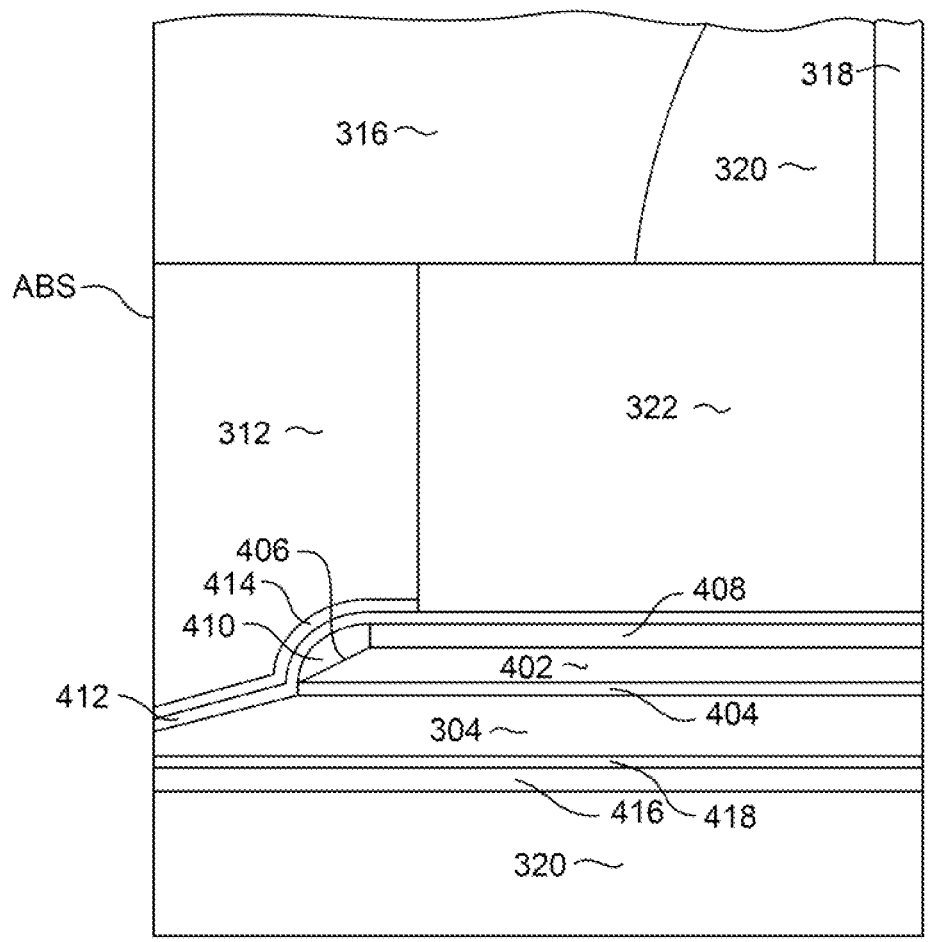
FIG. 4 is an enlarged view of a pole tip region of the magnetic recording head of FIG. 3.

FIG. 4 shows the pole tip region of the write head 302 enlarged and in greater detail. A tapered magnetic layer 402 is formed above the main write pole 304 and is separated from the main write pole 304 by a thin, non-magnetic layer 404. Because the non-magnetic layer 404 is thin, the magnetic layer 402 functions as a portion of the write pole, helping to conduct magnetic flux to the pole tip region. The magnetic layer 402 is preferably constructed as a lamination of high moment magnetic layers (such as CoFe) separated by thin non-magnetic layers (such as alumina). The non-magnetic spacer layer 404 can be constructed of a material such as TaO, which has advantageous properties for manufacturing that will be better understood upon reading the method of manufacturing a write head as presented below.

The magnetic layer 402 has a tapered trailing edge 406 at its end closest to the air bearing surface ABS, as shown in FIG. 4. This tapered surface 406 preferably forms an angle of about 25 degrees with respect to the surface of the rest of the layer 402 (e.g. relative to a plane that is perpendicular to the ABS.

A non-magnetic spacer layer 408 is provides at the top surface of the magnetic layer 402. This non-magnetic space layer can be constructed of a material such as NiCr and can have a thickness of about 50 nm or 40-60 nm. The spacer layer 408 provides a desirable additional spacing between the magnetic layer 402 and the trailing shield 312 in a region removed from the ABS in order to prevent the leakage of magnetic write field to the shield 312.

In order to further optimize the shape of the leading edge of the trailing shield 312 and to further optimize the magnetic spacing profile between the shield 312 and the magnetic layer 402 and write pole 304, a non-magnetic bump 410 is formed over the tapered portion of the magnetic layer 402 and preferably extends to the front edge of the non-magnetic step layer 408. This non-magnetic bump 410 can be constructed of alumina and can be constructed by a process that will be described below.

The trailing shield is separated from the write pole 304 by a non-magnetic gap layer 412, which is formed over the tapered trailing edge of the write pole 304 and also over the non-magnetic bump 410 and non-magnetic spacer 408. The non-magnetic gap layer 412 is deposited to a thickness that is carefully chosen to define a desired trailing gap thickness that will provide an optimal balance between maximizing write field strength (by minimizing the loss of write field to the trailing shield 312) and maximizing field gradient. The trailing gap layer can be constructed of a material such as Ru, or could also be Cr/Ru or Ta/. An optional high magnetic moment seed layer 414 may be provided at the leading edge of the trailing shield 312 to maximize the performance of the trailing shield 312.

In addition, non-magnetic layers 416, 418 can be provided at the leading edge (i.e. beneath) the write pole 304. These layers are remnants of a manufacturing process that will described below. The layer 416 is a RIE stop layer that will be described in greater detail herein below. The layer 418 is a conformally deposited, non-magnetic layer of a material such as Ru that is useful in a track width narrowing process that will described below.

Figure 5:
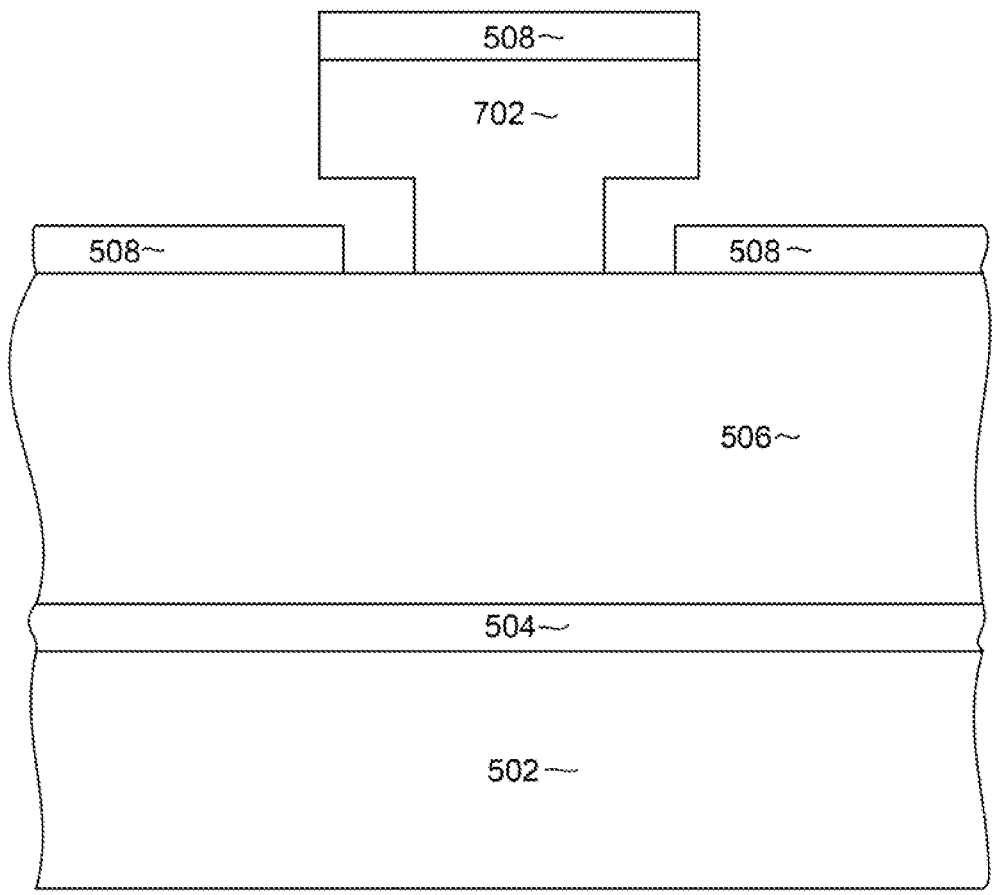
FIGS. 5-26, are views of a portion of a magnetic write head in various intermediate stages of manufacture, illustrating a method for manufacturing a magnetic write head according to an embodiment of the invention.
Figure 6:
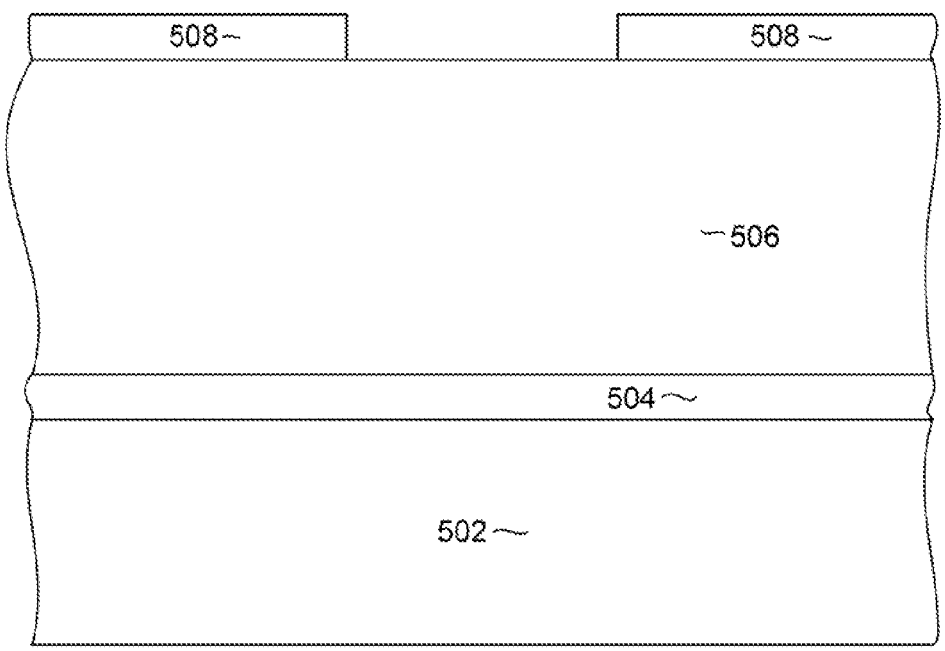

FIGS. 5-26 illustrate a method for manufacturing a magnetic write head such as that described above. With particular reference to FIG. 5, a substrate 502 is provided. The substrate is a non-magnetic layer such as the layer 320 of FIG. 3. A layer of material that is resistant to reactive ion etching (RIE stop layer 504) is deposited over the substrate. The RIE stop layer 504 can be a material such as Cr, NiCr, Ru or laminated layers of these materials. A thick RIEable till layer 506 is deposited over the RIE stop layer 504. The RIEable fill layer 506 can be for example alumina ($Al_2O_3$) or $SiO_2$, and is deposited at least as thick as the desired thickness of a desired write pole thickness, as will become apparent below.

With continued reference to FIG. 5, a bi-layer photoresist mask 702 is formed. This mask 702 is photolithographically patterned to a desired shape to define a write pole. A hard mask layer 508 is then deposited over the mask 702 and RIEable layer 506. The hard mask 702 is a material that is resistant to ion milling, but which can be removed by another process such as reactive ion etching (RIE). To this end, the hard mask 508 can be constructed of a material such as NiCr, although other materials can be used as well. The bi-layer mask 702 can then be lifted off, leaving a structure such as that shown in FIG. 6. Then, a reactive ion etching (RIE) is performed to remove portions of the RIEable layer 506 that are not protected by the hard mask 508, leaving a structure such as that shown in FIG. 9. The RIE is preferably performed at one or more angles relative to normal to form the RIEable layer 506 with trench having tapered side walls 902. The above described liftoff process for patterning the hard mask 508 is only one possible example.

Figure 7:
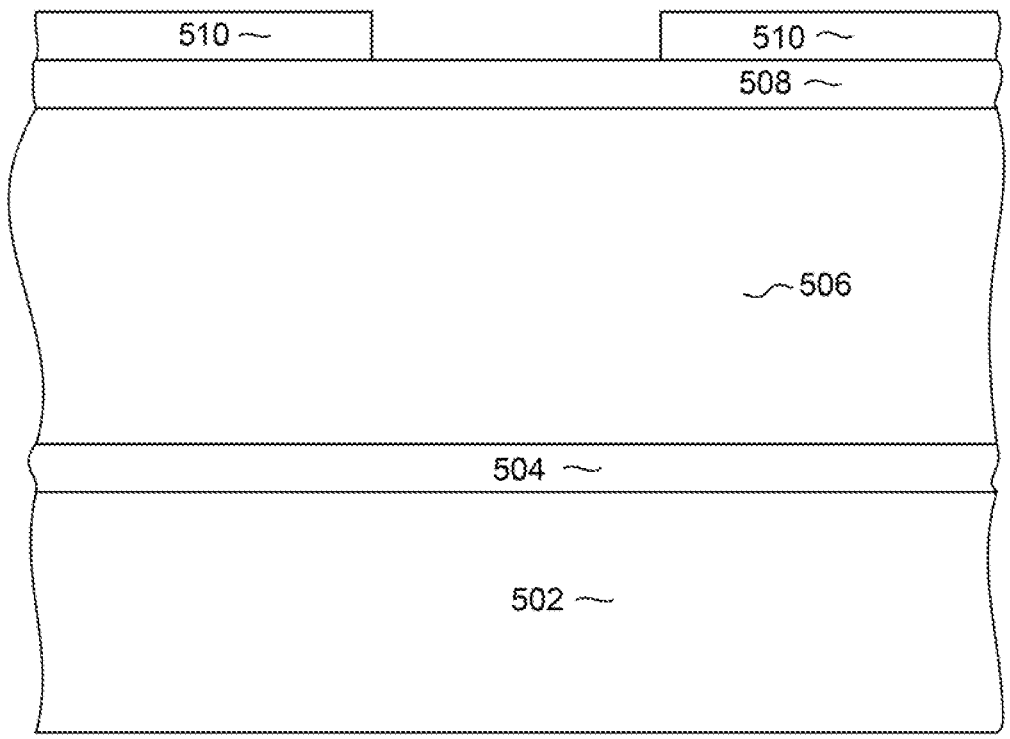
Figure 8:
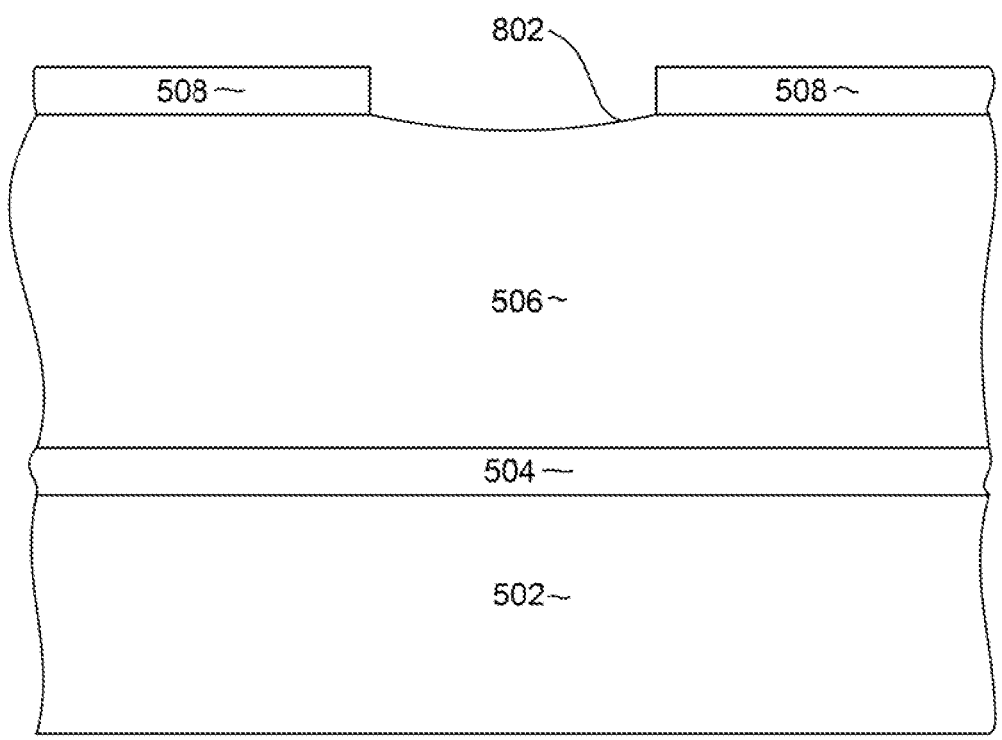
Figure 9:
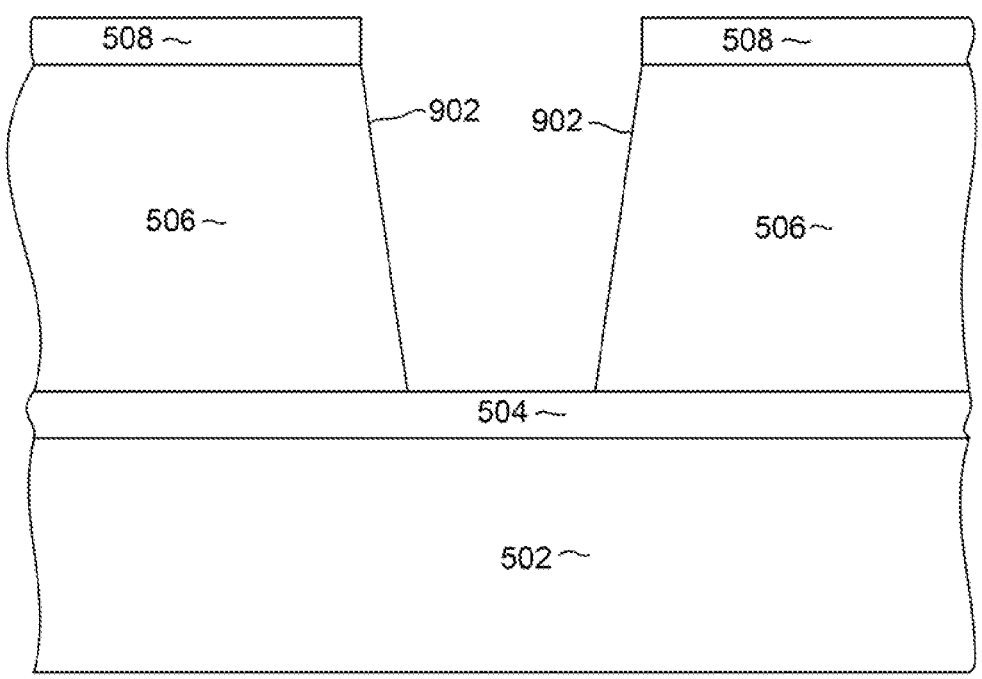

With reference to FIG. 7, another method for patterning the hard mask includes depositing a full film hard mask layer 508 and then forming a photoresist mask 510 having an opening that is configured with an opening to define a write pole. An ion milling can then be performed to form remove portions of the hard mask layer that are not protected by the photoresist mask 510. This leaves a structure as shown in FIG. 8, with an opening 802 having been formed in the hard mask layer 508. A portion of the RIEable fill layer 506 may also have been removed during the ion milling as well, as shown in FIG. 8. A reactive ion etching can then be performed to form the trench with tapered side walls 902 as described above with reference to FIG. 9.

Figure 10:
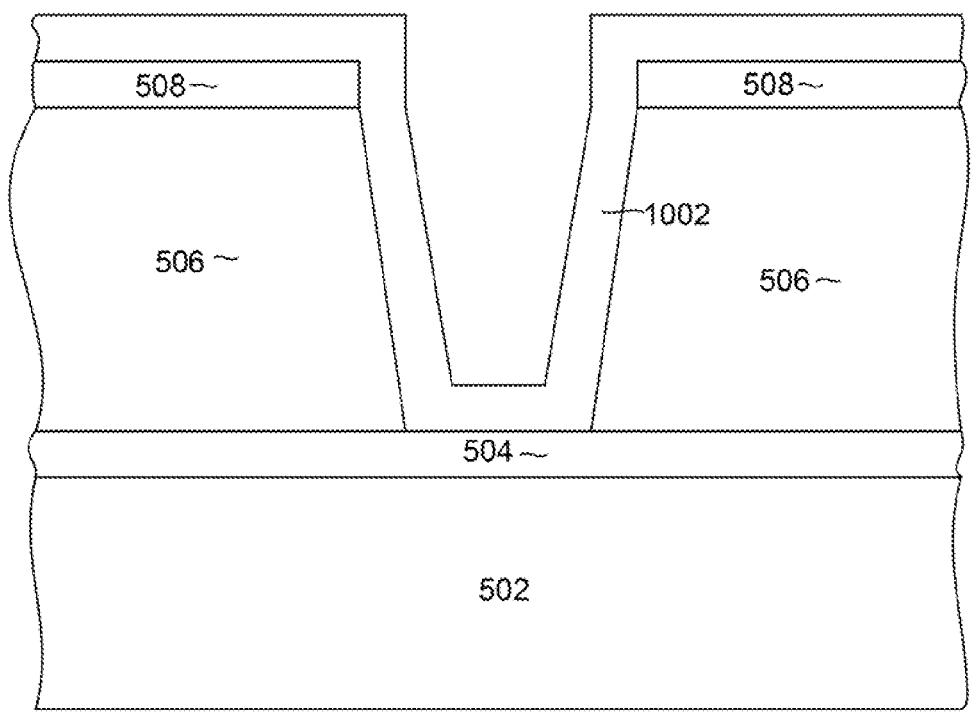
Figure 11:
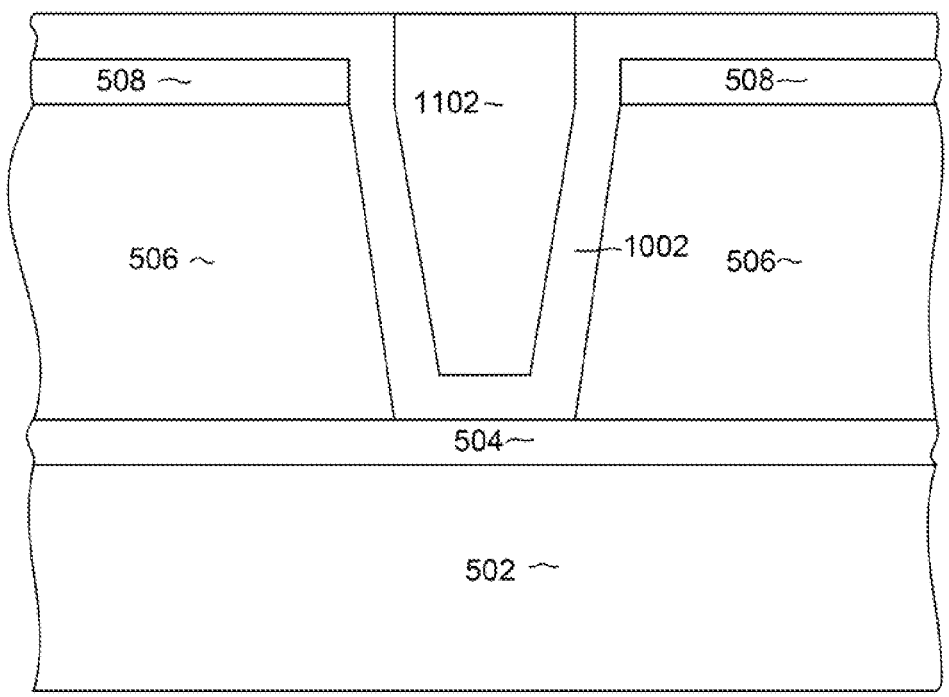

With the trench formed in the RIEable layer (as described above with reference to FIG. 9), a non-magnetic material 1002 can be deposited by a conformal deposition process such as atomic layer deposition, as shown in FIG. 10. This non-magnetic material can be, for example Ru, and can be deposited to a sufficient thickness to advantageously reduce the width of the trench in order to shrink the track width of the yet to be formed write pole.

Figure 12:
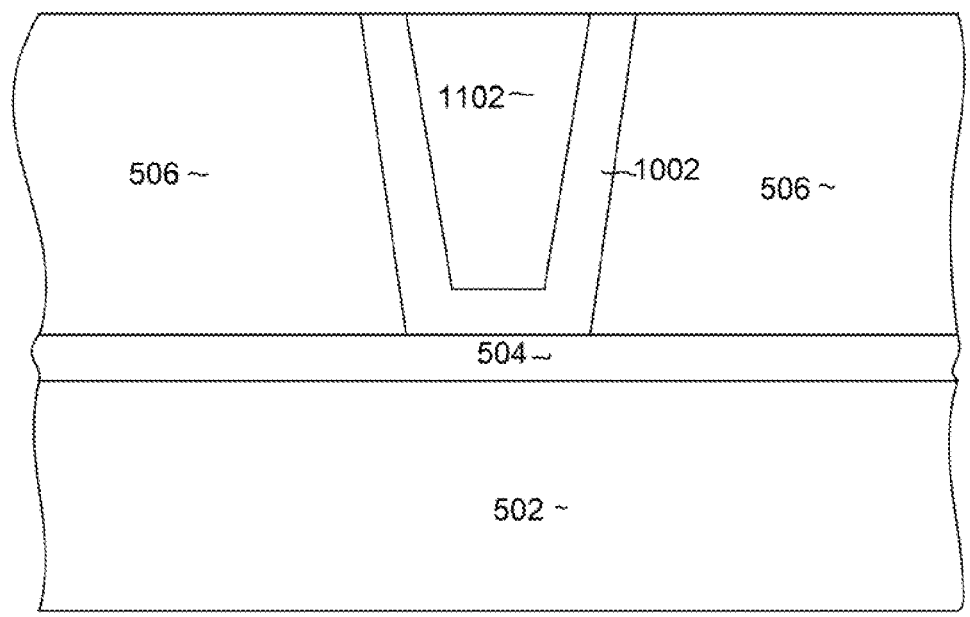

The non-magnetic layer 1002 can be an electrically conductive material so that it can be used as an electroplating seed as well as a track width reducing layer. Then, a magnetic material such as CoFe 1102 can be electroplated into the trench formed in the RIEable layer 506. An optional CMP process can be performed to planarize the magnetic layer, leaving a structure shown in FIG. 11, with a write pole material 1102 in the trench. An ion milling can then be performed to remove portions of the non-magnetic layer 1002 that extend over the RIEable layer (beyond the write pole 1102) leaving a structure as shown in FIG. 12.

Figure 13:
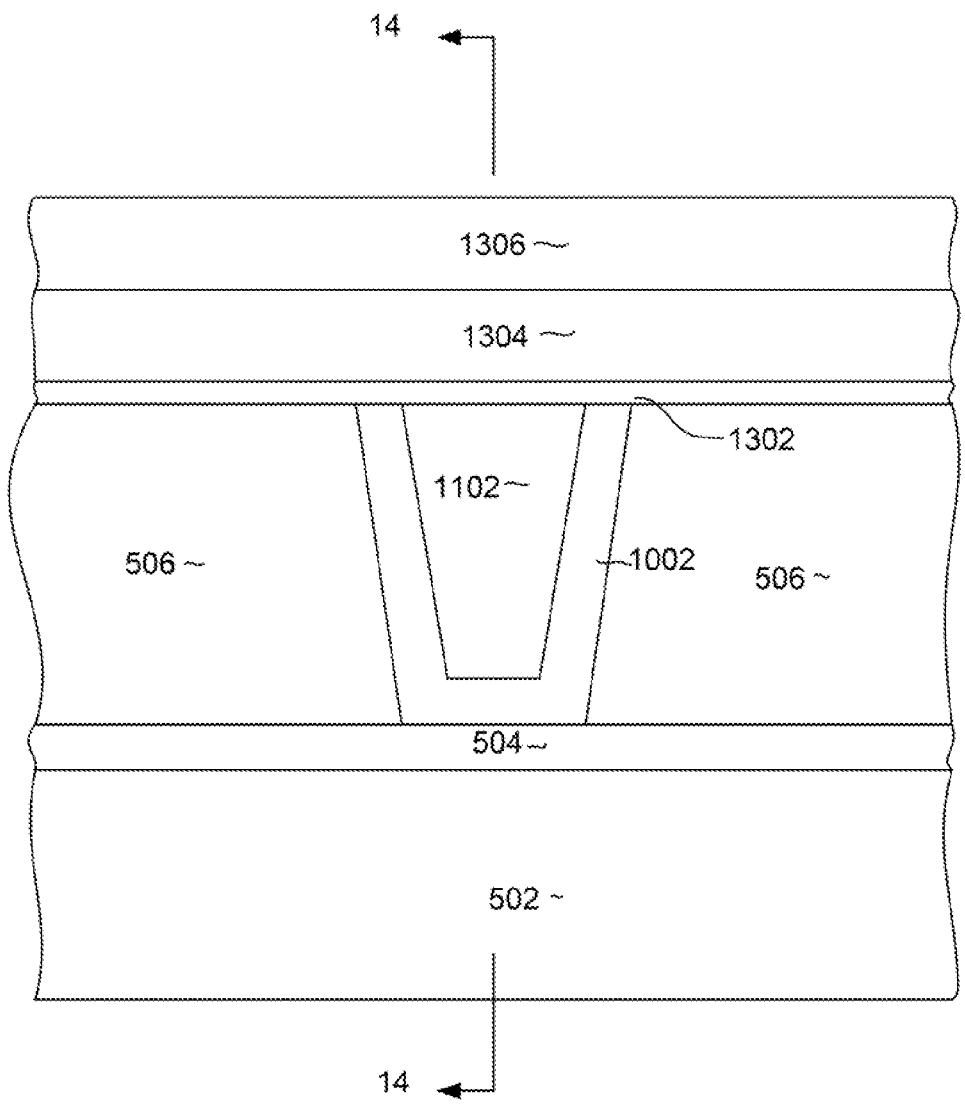

With reference now to FIG. 13, a series of layers are deposited full film. First, a thin, non-magnetic layer such as TaO or $SiO_2$ 1302 is deposited over the write pole 1102 and RIEable material 506. The non-magnetic layer 1302 can be deposited to a thickness of 1-5 nm or about 3 nm. Then, a magnetic material layer 1304 is deposited over the thin non-magnetic layer 1302. The magnetic material layer 1304 is preferably a lamination of layers of high magnetic moment material such as CoFe separated by thin layers of non-magnetic material such as alumina. The magnetic material layer 1304 can be deposited to a thickness of 40-60 nm or about 50 nm. Then, a non-magnetic spacer layer 1306 is deposited over the magnetic material layer 1304. The non-magnetic spacer layer can be, for example, NiCr, and can be deposited to a thickness of 40-60 nm or about 50 nm.

Figure 14:
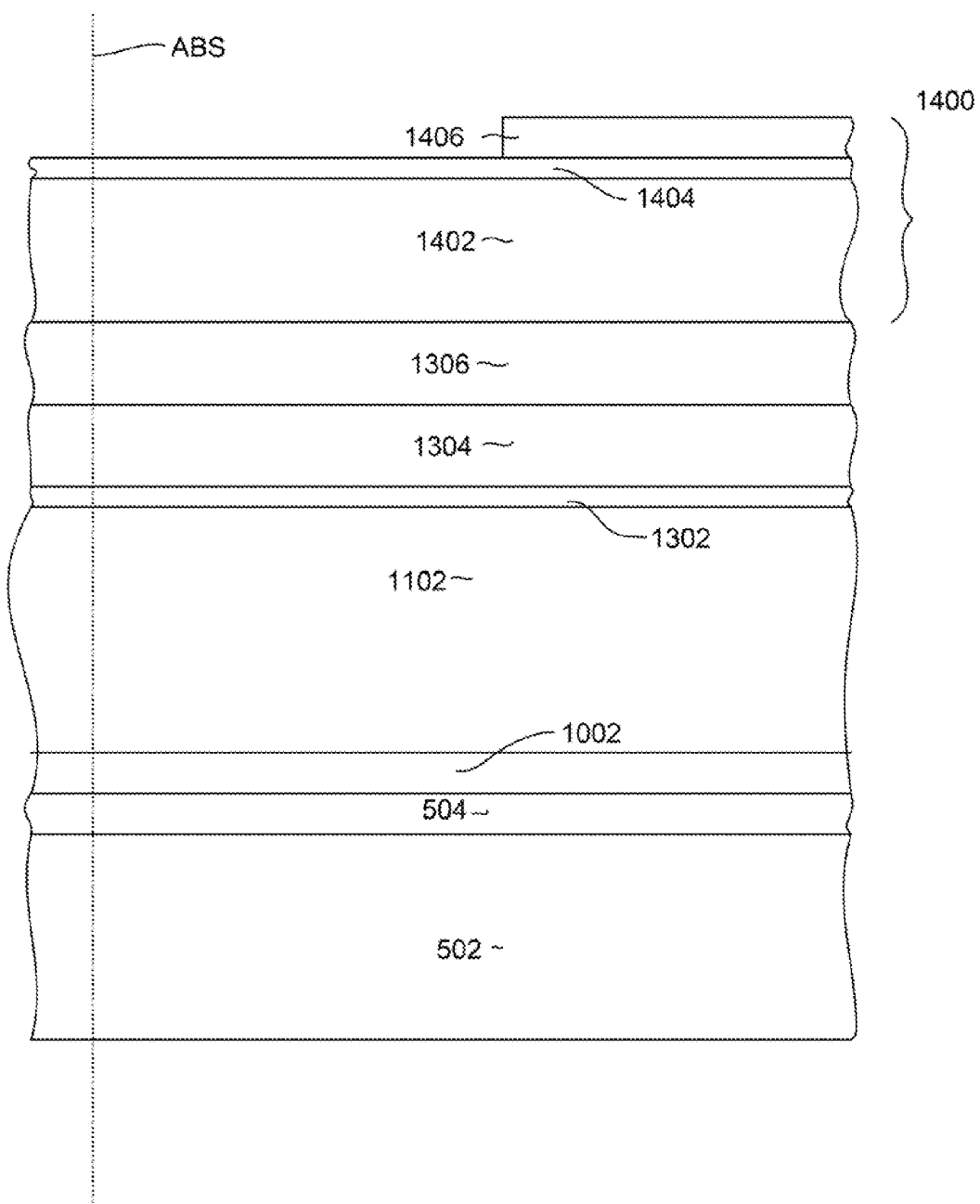
Figure 15:
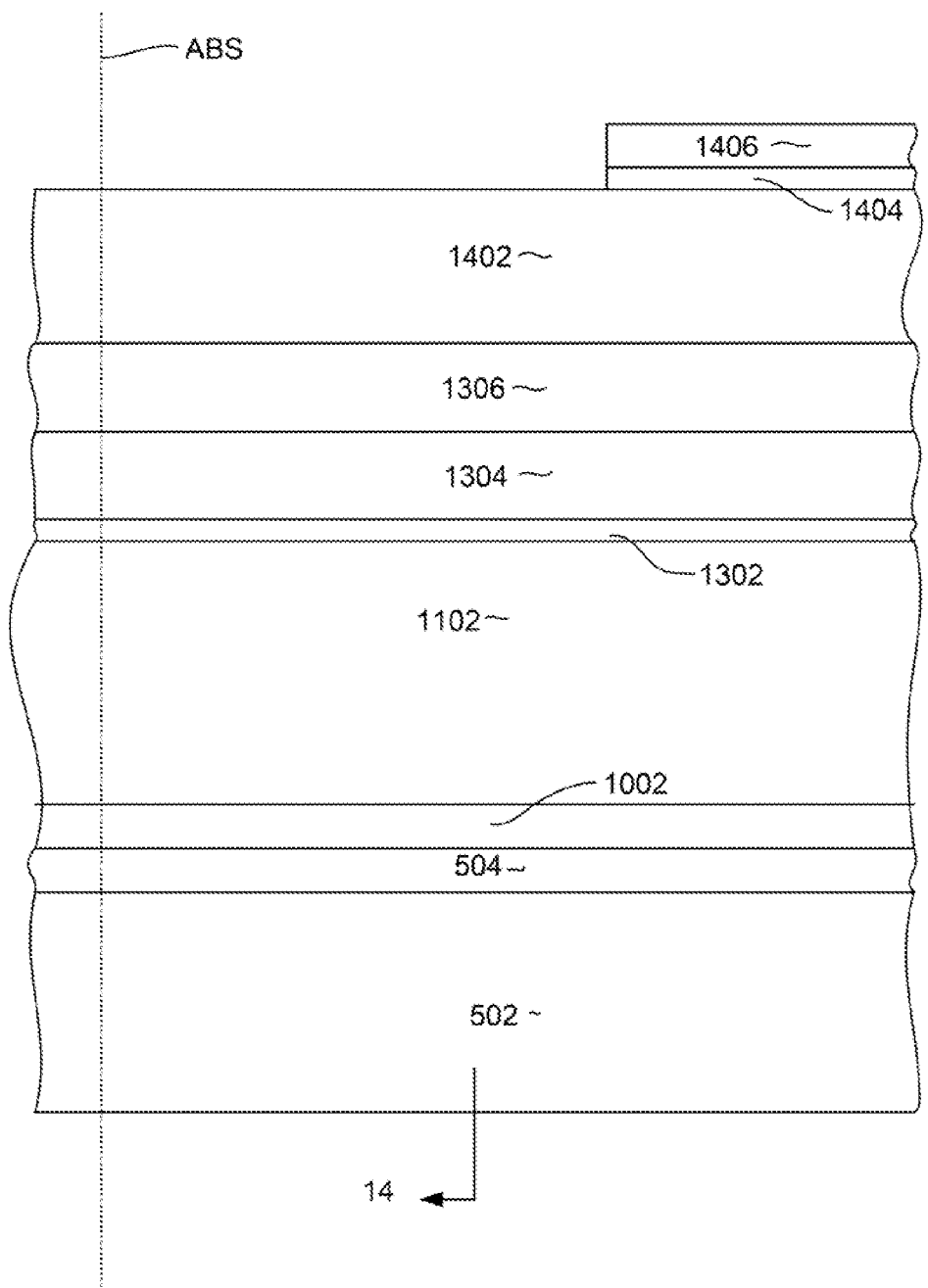
Figure 16:
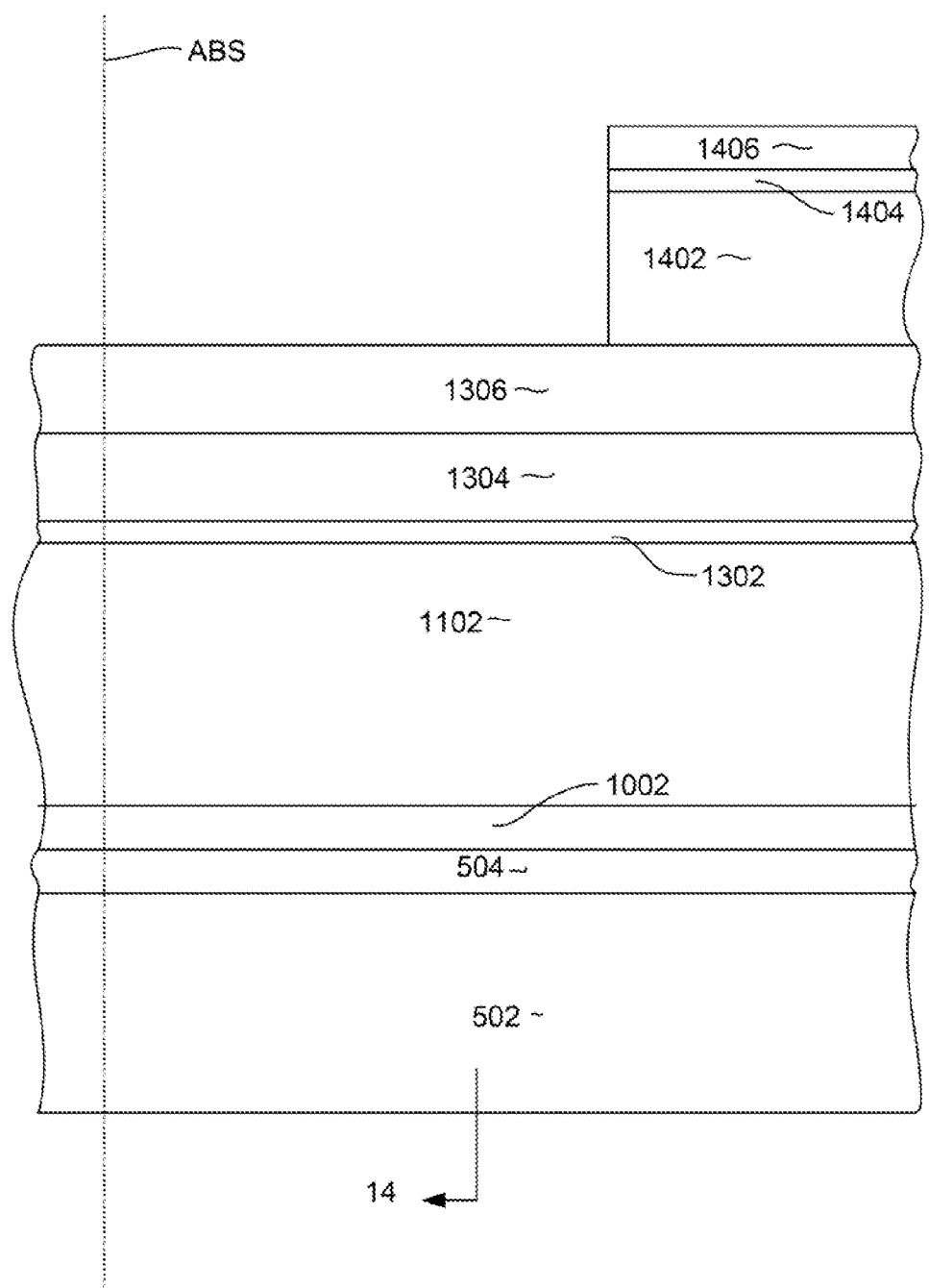
Figure 17:
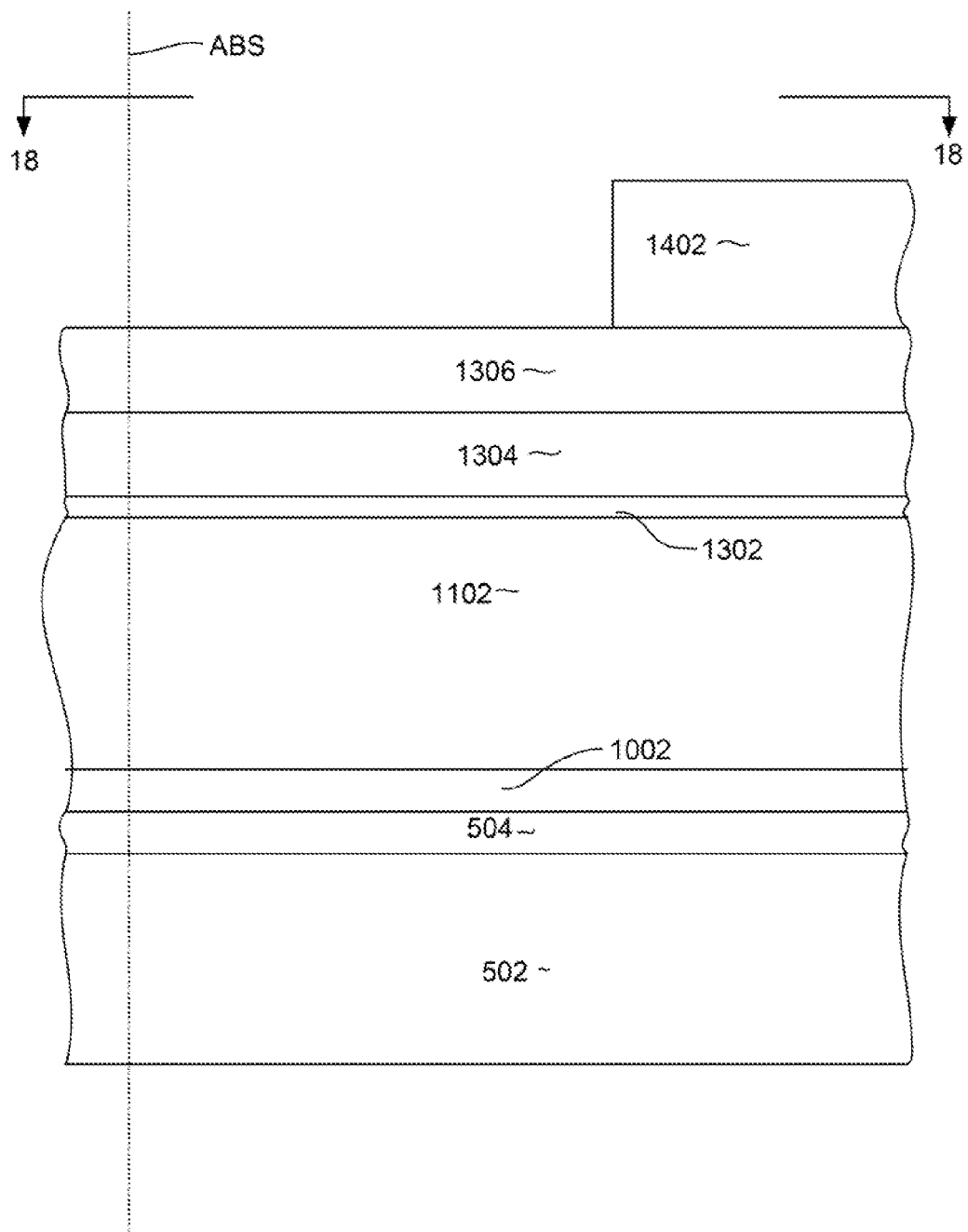
Figure 18:
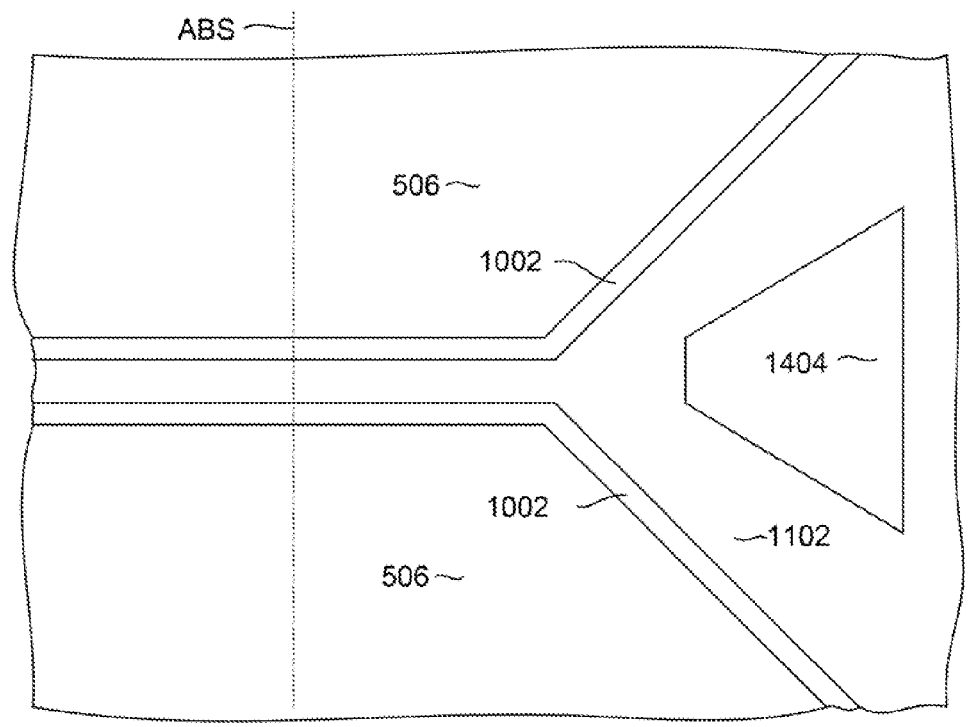

FIG. 14 is a side cross sectional view as seen from line 14-14 of FIG. 13. As shown in FIG. 14, a series of mask layers 1400 are deposited over the layer 1306. The mask layers can include a mask material such SiC a hard mask layer 1404 and a photoresist layer 1406 that is photolithographically patterned to form a mask having a front edge that is located a desired distance from an intended air bearing surface plane indicated by dashed line ABS. Then, an ion milling can be used to transfer the image of the photoresist onto the underlying hard mask 1404, leaving a structure as shown in FIG. 15. A reactive ion etching can then be used to transfer the image of layers 1406 and 1404 onto the underlying non-magnetic layer 1402, leaving a structure as shown in FIG. 16. Any remaining portions of layer 1404 can then be removed leaving a structure as shown in FIG. 17. FIG. 18 shows a top down view of the structure of FIG. 17, as viewed from line 18-18 of FIG. 17.

Figure 19:
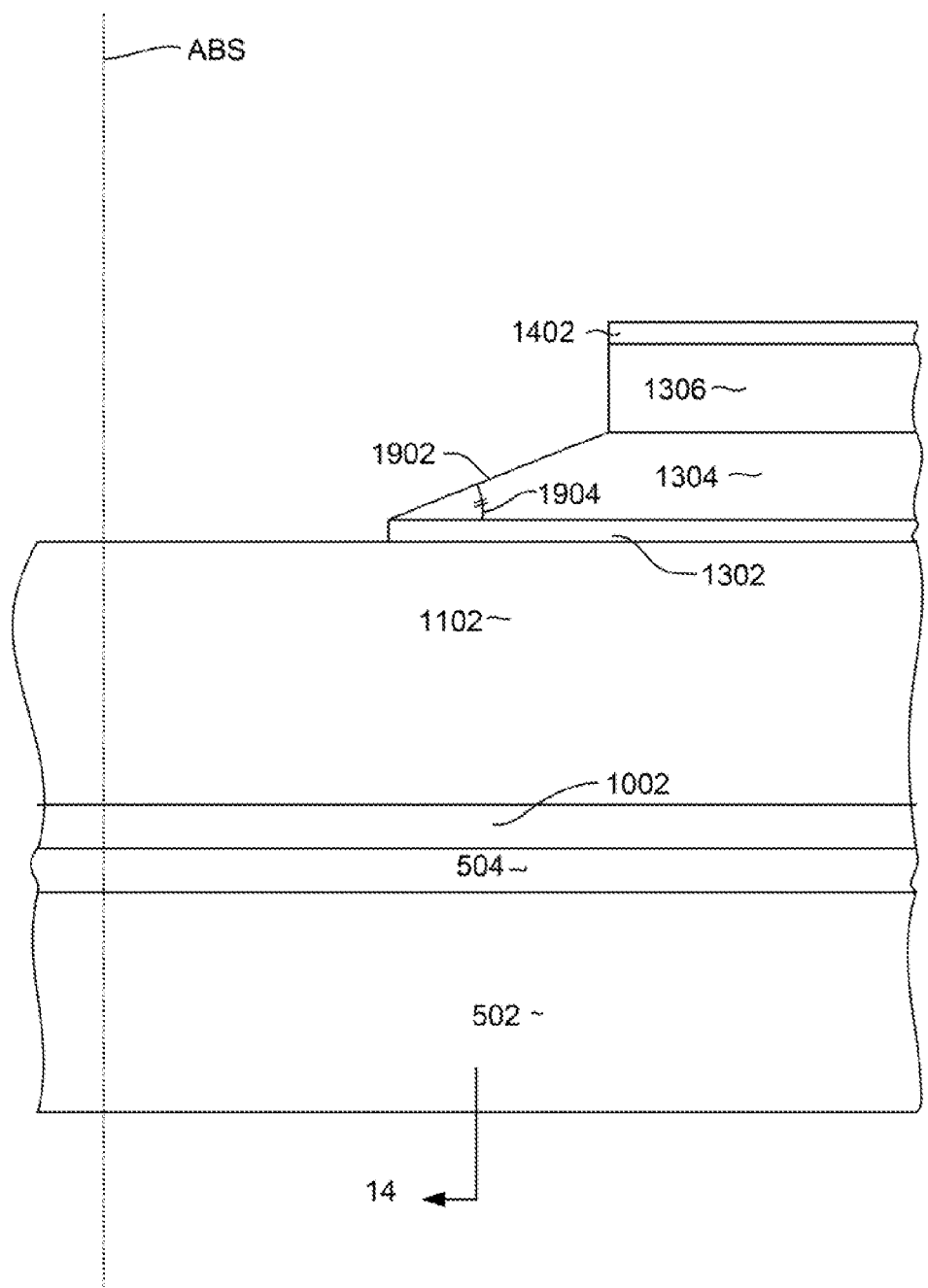

Then, with reference to FIG. 19, an ion milling is performed to remove a portion of the magnetic material layer 1304, forming a tapered surface 1902 on the magnetic material layer 1304. The ion milling is performed at one or more angles relative to normal, such that shadowing from the non-magnetic step layer 1306 causes the tapered surface to from an angel 1904 of 30 to 40 degrees or about 25 degrees with respect to a plane that is parallel with the surfaces of the as deposited layers. This ion milling also removes portions of the layer 1302 that are not protected by the layer 1304, as shown in FIG. 19.

Figure 20:
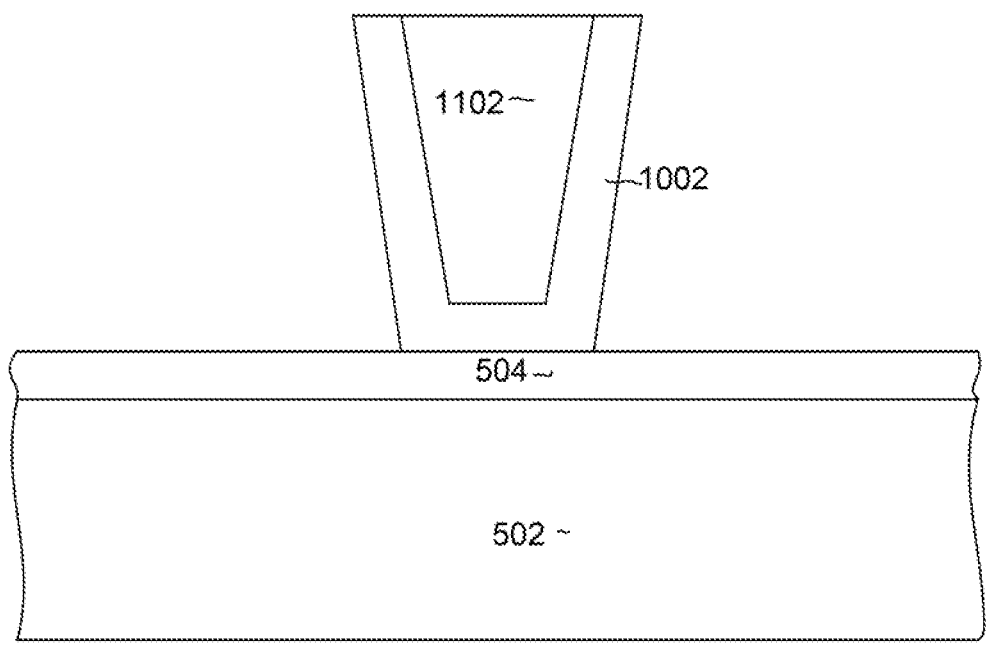

A reactive ion etching can then be performed to remove the remaining RIEable fill layer 506 (FIG. 13), leaving a structure as shown in FIG. 20. FIG. 20 shows a view along a plane that is parallel with the ABS plane. The reactive ion etching stops at the RIE stop layer 504.

Figure 21:
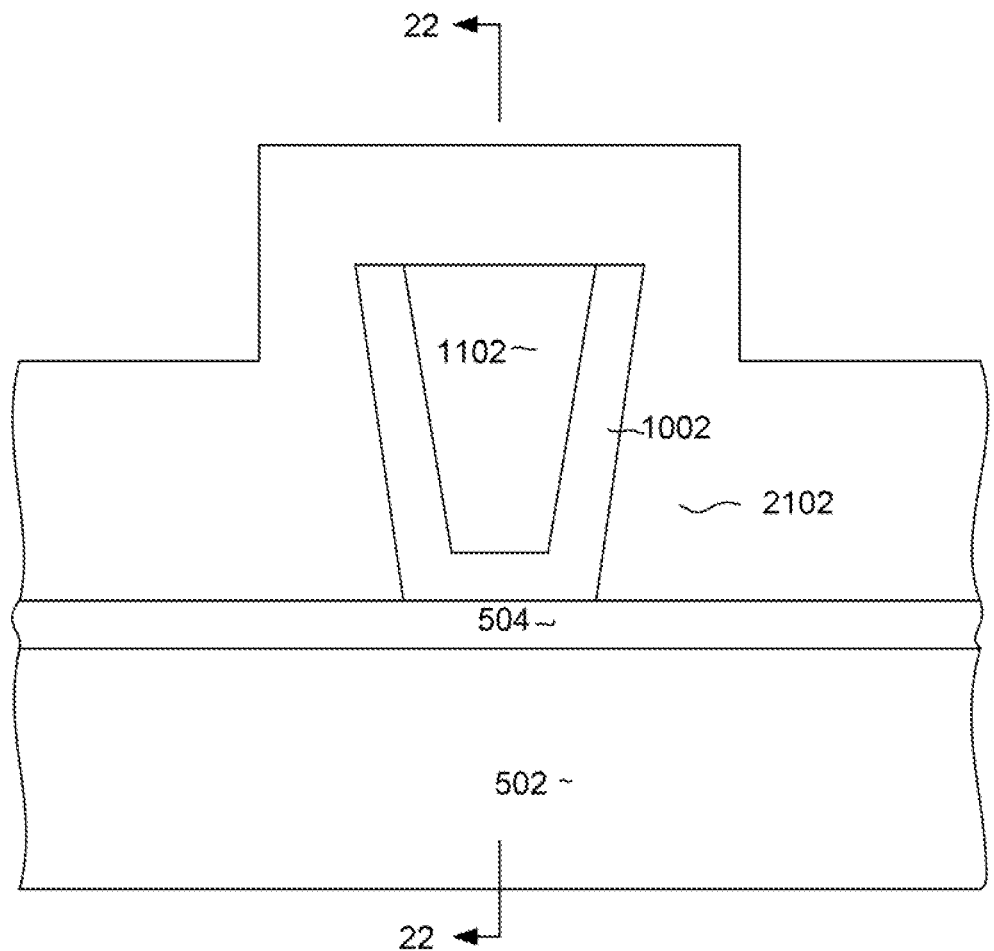
Figure 22:
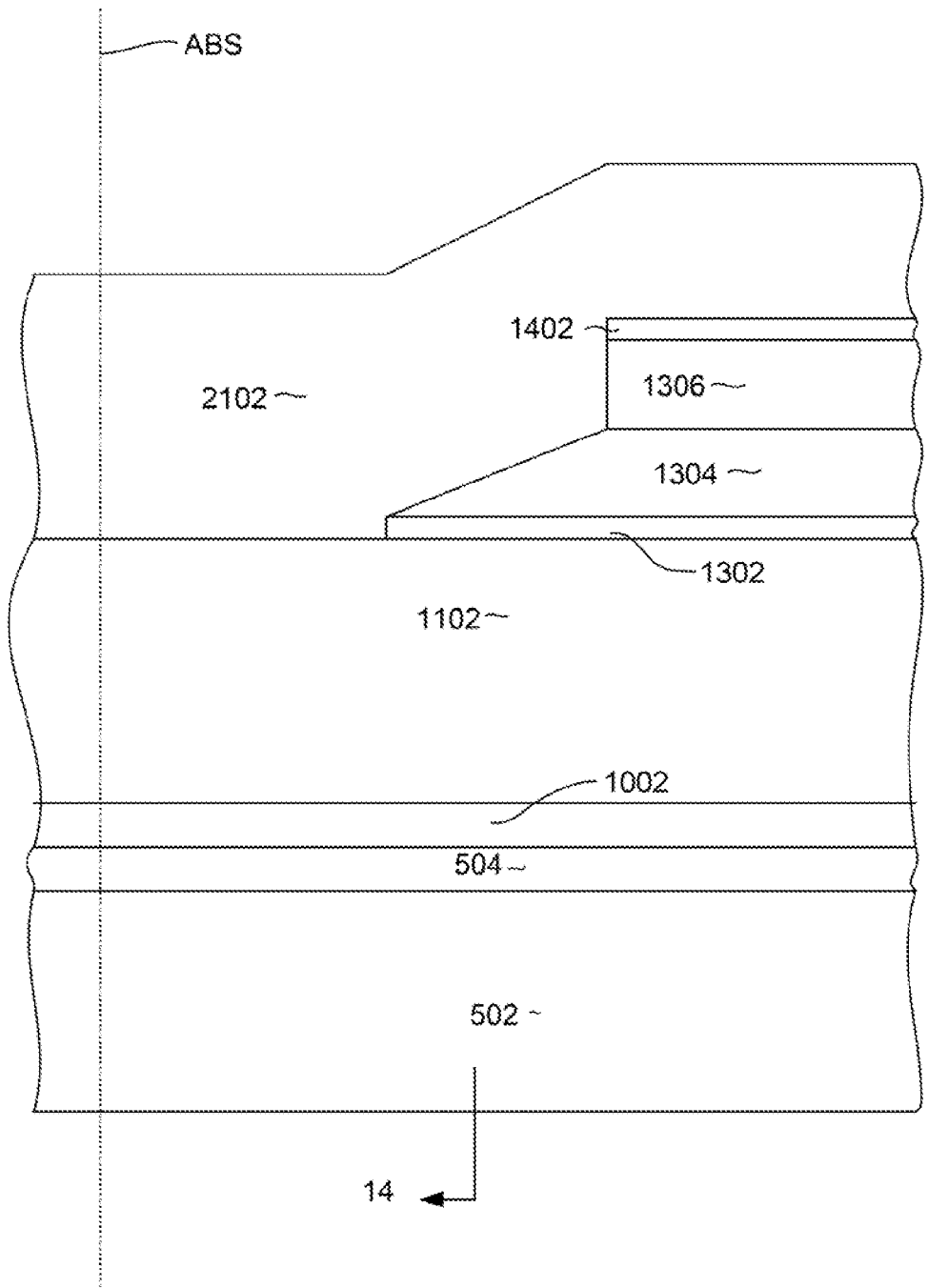

With reference to FIGS. 21 and 22 a layer of alumina 2102 is deposited, preferably by a conformal deposition process such as atomic layer deposition (ALD). The alumina is preferably deposited to a thickness of 70-90 nm or about 80 nm. FIG. 21 shows a cross sectional view of a plane that is parallel with the ABS, and FIG. 22 shows a side cross sectional view as seen from line 22-22 of FIG. 21.

Figure 23:
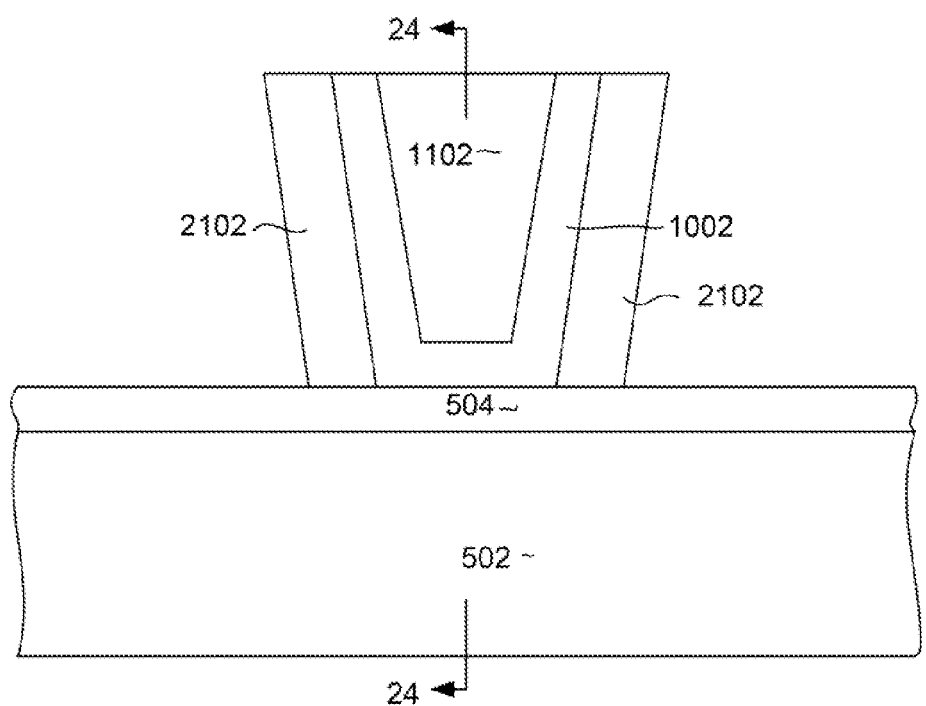
Figure 24:
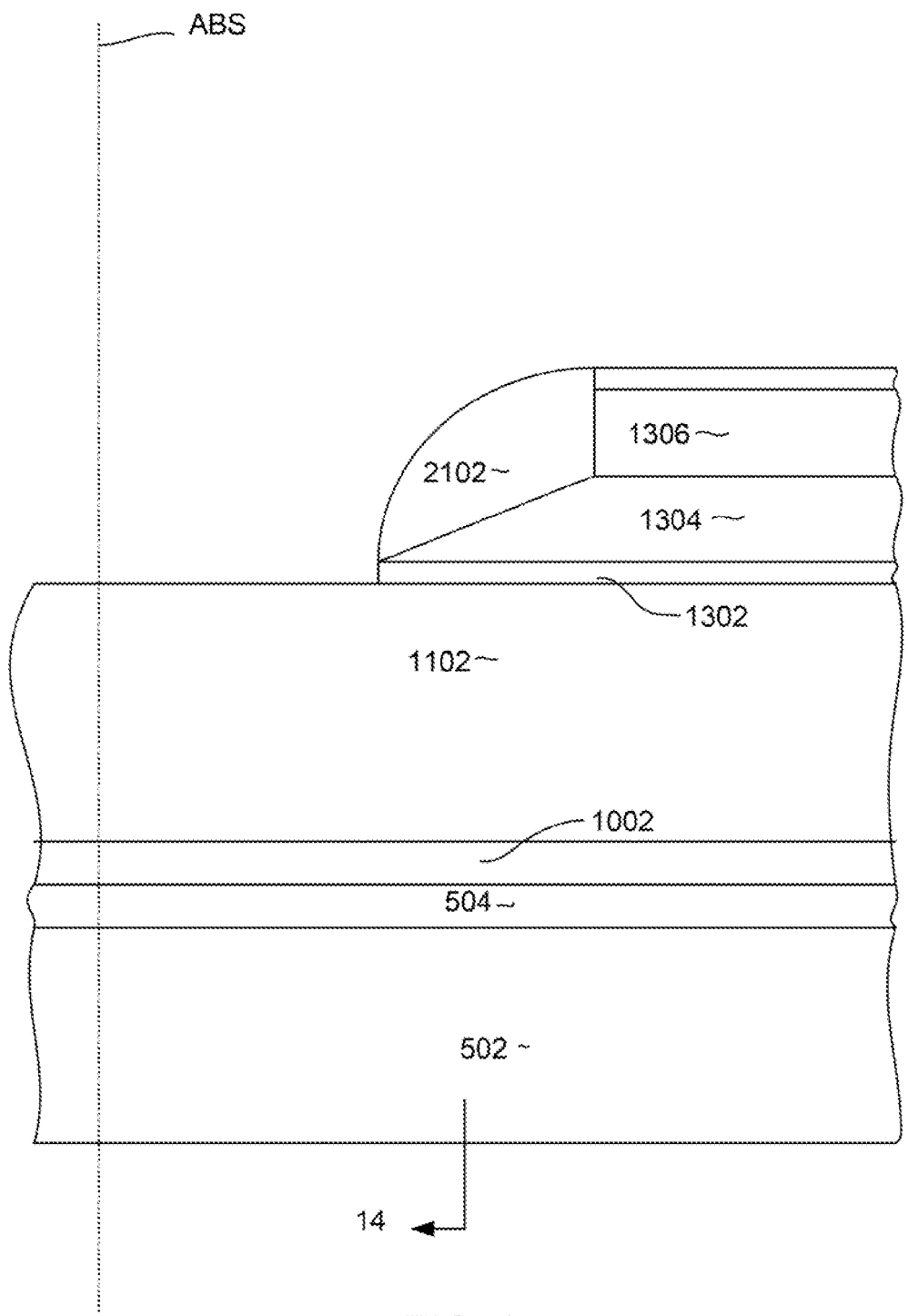

Another ion milling is then performed to preferentially remove horizontally disposed portions of the alumina layer 2102. This leaves alumina side walls 2102 as shown in FIG. 23. In addition, as shown in FIG. 24, this ion milling leaves an alumina bump 2102 at the front of the non-magnetic spacer layer 1306 and over the tapered portion of the magnetic layer 1304.

Figure 25:
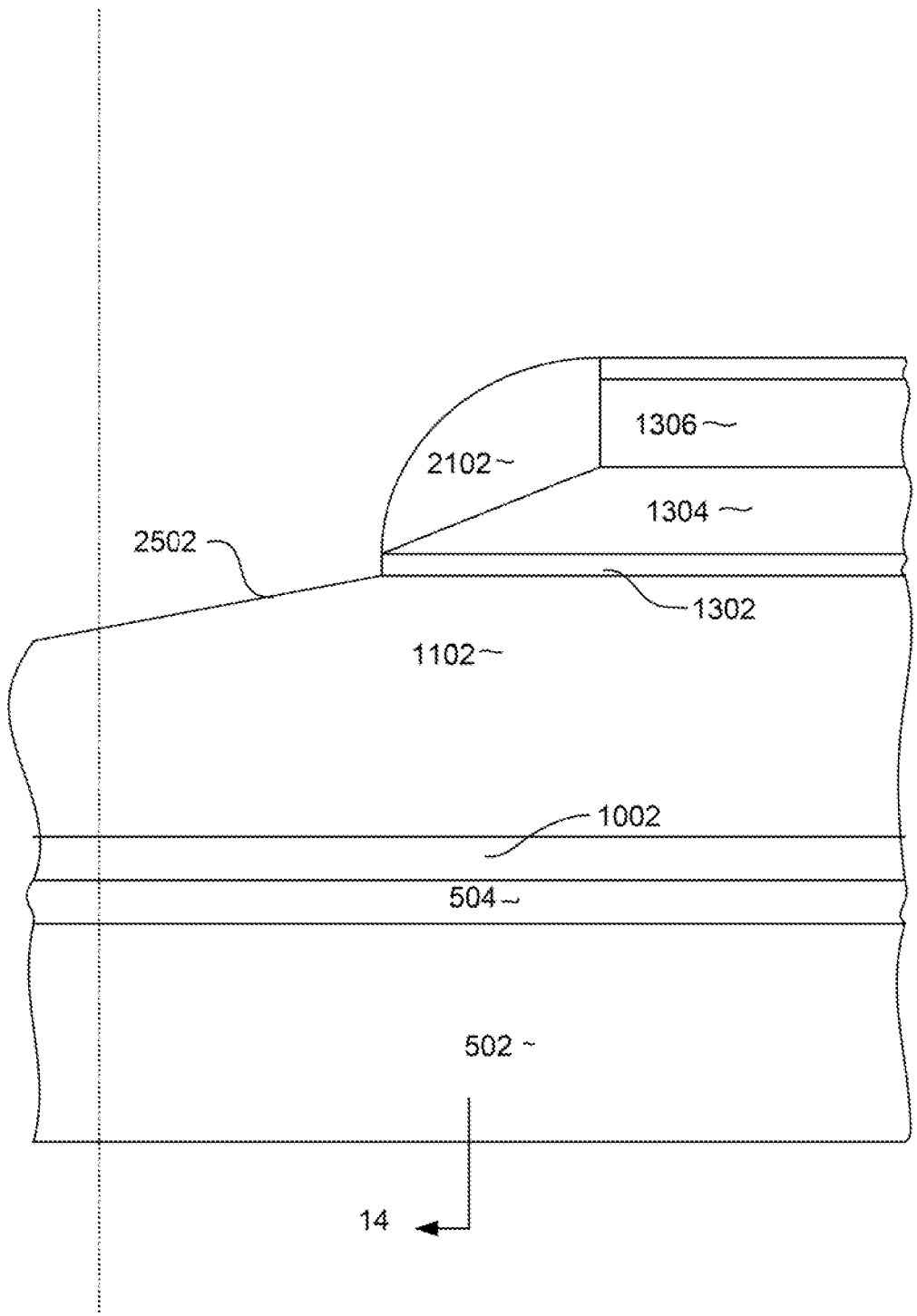

Another ion milling can then be performed to remove portions of the write pole layer 1102 that are not protected by the layers 1302, 1304, 1306 and 2102, forming a tapered surface 2502 on the write pole as shown in FIG. 25. This ion milling is preferably performed at such an angle or angles relative to normal so as to form a tapered surface that defines an angle of 20-30 or about 25 degrees relative horizontal (i.e. relative to a plane that parallel with the as deposited surfaces of layers such as the layer 1102.

Figure 26:
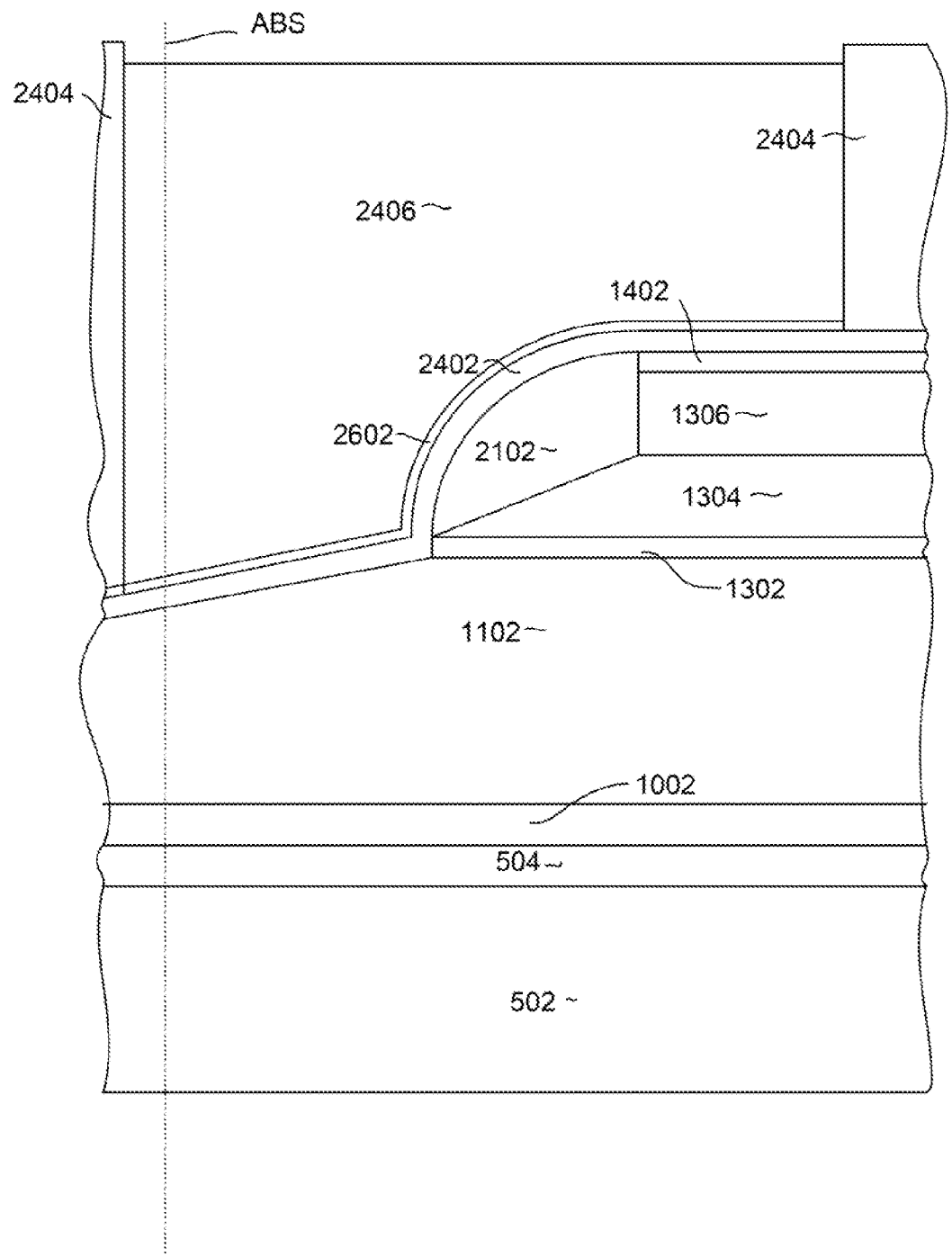

Then, with reference to FIG. 26, a non-magnetic gap layer 2402 is deposited, preferably by a conformal deposition process such as atomic layer deposition or chemical vapor deposition. The gap layer 2402 is deposited to a thickness that is chosen to provide a desired trailing gap thickness to provide a separation between the magnetic layer 1102 and trailing gap layer 2406 that will provide an optimal balance between maximizing write field gradient and minimizing write field loss to the trailing shield 2406. The gap layer 2402 can be constructed of an electrically conductive material that can also function as an electroplating seed. For example, the gap layer can be constructed of a material such as Ru and can be deposited to a thickness of about 20-30 nm.

Then, a magnetic trailing shield 2406 is formed. The shield 2406 can be formed by first forming an electroplating frame mask 2404 such as from a photolithographically patterned photoresist. Then, a magnetic material such as NiFe can be electroplated into the opening in the mask to form the shield 2406. Optionally, a high magnetic moment seed layer such as CoFe 2602 can be deposited or electroplated before electroplating the rest of the shield to improve the performance of the shield 2406.

Figure 27:
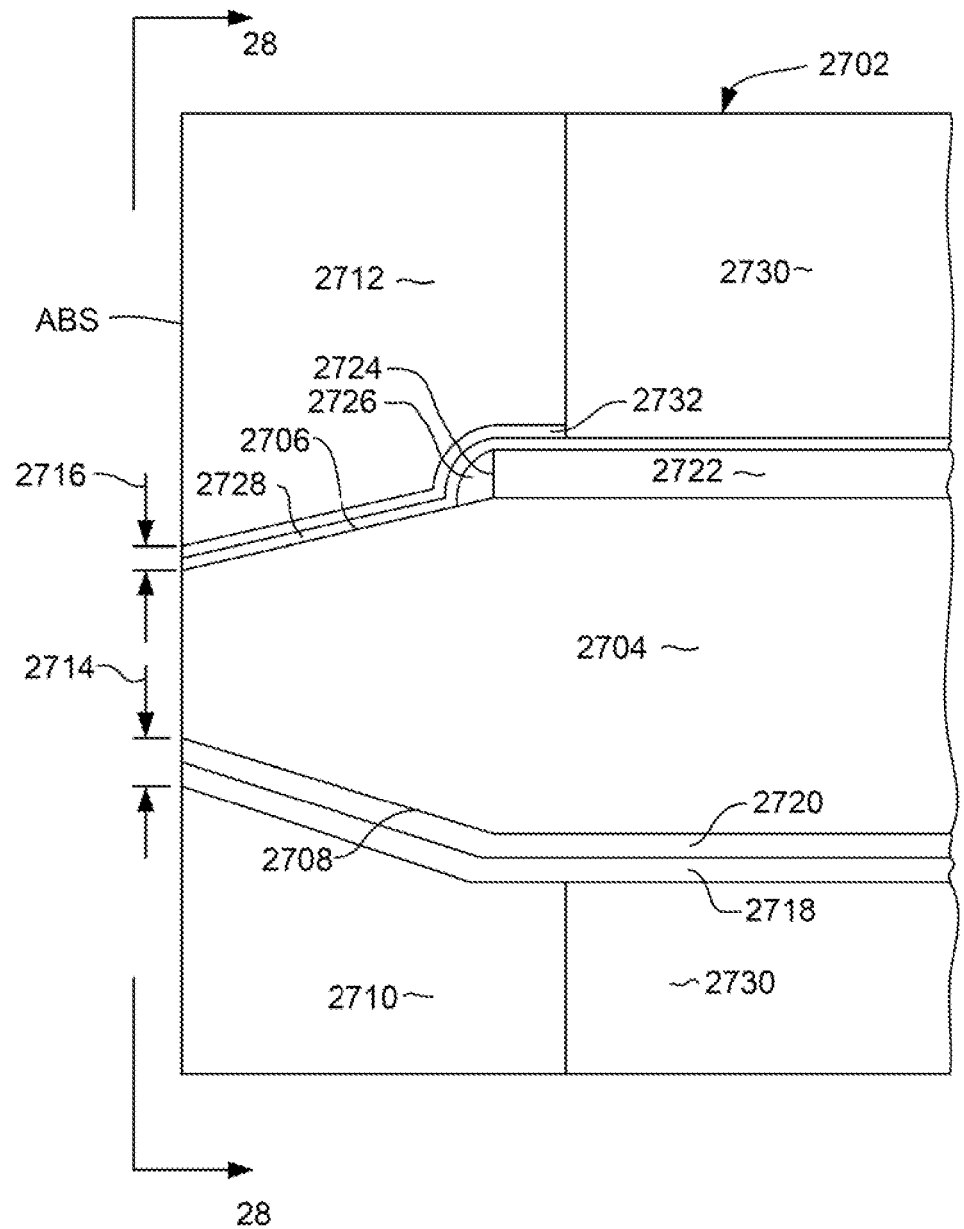
FIG. 27 is a cross sectional view of a pole tip region of a write head according to an alternate embodiment of the invention.
Figure 28:
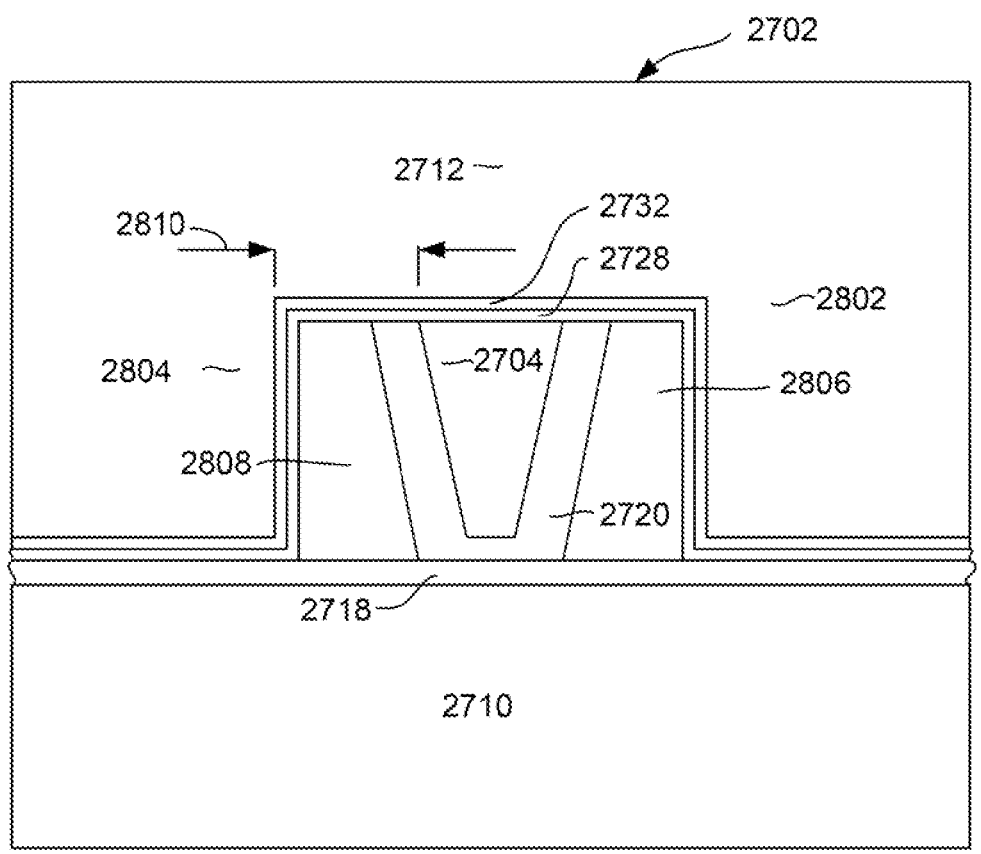
FIG. 28 is an ABS view of the write head of FIG. 27, as viewed from line 28-28 of FIG. 27.

With reference now to FIGS. 27 and 28, a pole tip portion of a write head according to an alternate embodiment of the invention is shown. As shown in FIG. 27, the write head 2702 includes a write pole 2704 that has a tapered trailing edge portion 2706 (similar to the previously described embodiment), but which also has a tapered leading edge portion 2708. Having both tapered trailing and leading edges further optimizes the performance of the write head 2702 by focusing magnetic flux to the tip of the write pole 2704 while avoiding magnetic saturation of the write pole 2704.

The write head 2702 also differs from the above described write head in that it has a leading magnetic shield 2710 as well as a trailing magnetic shield 2712. The leading magnetic shield 2710 is separated from the write pole 2704 by a leading gap distance 2714 and the trailing shield is separated from the trailing edge of the write pole 2704 by a trailing gap distance 2716, the leading gap distance 2714 being significantly larger than the trailing gap distance 2716 so as to prevent magnetic write field from being drawn toward the leading shield 2710 during operation. The leading gap distance 2714 is preferably at least twice the trailing gap distance 2716, and is more preferably about four times the trailing gap distance 2716. More specifically, the leading gap distance can be about 100 nm, whereas the trailing gap distance can be about 25 nm.

The leading shield 2710 is separated from the write pole 2704 by first and second nonmagnetic layers 2718, 2720. The first layer 2718 can be constructed of a material such as Cr or NiCr. The second layer 2720 can be constructed of a material such as Ru.

The write head also includes a non-magnetic spacer layer 2722 which can be constructed of a material such as NiCr and can have a thickness of 50-200 nm. The non-magnetic spacer layer has a front edge 2724 that is located a desired distance from the air bearing surface ABS. A non-magnetic bump 2726, constructed of a material such as alumina $Al_2O_3$ is formed at the front edge of the non-magnetic spacer layer 2722, extending over a portion of the tapered trailing edge 2706 of the write pole 2704. The non-magnetic spacer layer 2722 and non-magnetic bump layer 2726 provide additional spacing between the trailing magnetic shield 2712 and the write pole 2704 and also optimize the profile of this spacing by providing a smooth transition to this additional spacing.

The write head also includes a non-magnetic trailing gap layer 2728 that separates the trailing magnetic shield 2712 from the write pole 2704 and which may also extend over the non-magnetic bump 2726 and non-magnetic spacer layer 2722. The non-magnetic trailing gap layer can be constructed of a material such as Ru. In addition, non-magnetic, electrically insulating fill layers 2730 may be provided behind the shields 2710, 2712, although structures could be included in these regions as well. Also, a high magnetic moment seed layer 2732 such as CoFe may be included at the bottom of the trailing shield 2712 to improve the performance of the trailing shield.

FIG. 28 shows the write head 2702 as viewed from the air bearing surface. As can be seen in FIG. 28, the trailing magnetic shield 2712 extends downward beyond the sides of the write pole to form side shielding portions 2802, 2804. For this reason, the trailing shield 2712 can also be referred to as a "wrap-around" shield. Write head also includes non-magnetic insulating side till layers 2806, 2808 that (for reasons that will become apparent below) are preferably constructed of a RIEable material such as $SiO_2$ or alumina. It also can be seen, that the non-magnetic side till layers have substantially vertical outer sides, and that the Ru layer 2720 discussed above with reference to FIG. 27, also extends up the sides of the write head (also for reasons that will become apparent below). The thickness of the layers 2720, 2806, 2728, 2732 define the side gap distance 2810.

Figure 29:
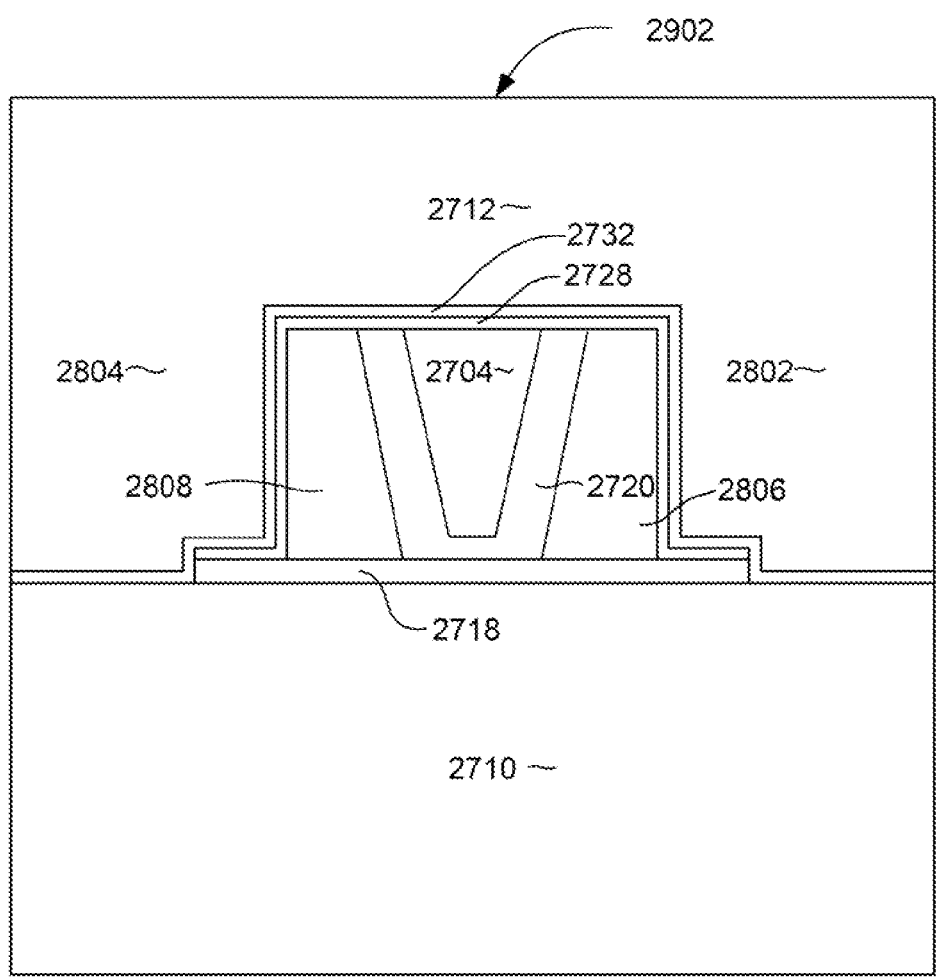
FIG. 29 is an ABS view of a write head according to another alternate embodiment of the invention.

It can be seen in FIG. 28, that the layers 2718 and 2728 extend between the trailing shield 2712 and the leading shield 2710 so that the shields 2712, 2710 do not contact one another. In another embodiment of the invention 2902, as shown in FIG. 29, the layers 2718 and 2728 terminate at some point away from the write pole 2704 so that the trailing shield 2712 and leading shield 2710 make magnetic contact at regions beyond the layers 2718, 2728. This embodiment can improve the performance of the trailing shield 2712 by improving the flow of magnetic flux from the trailing shield 2712.

Figure 30:
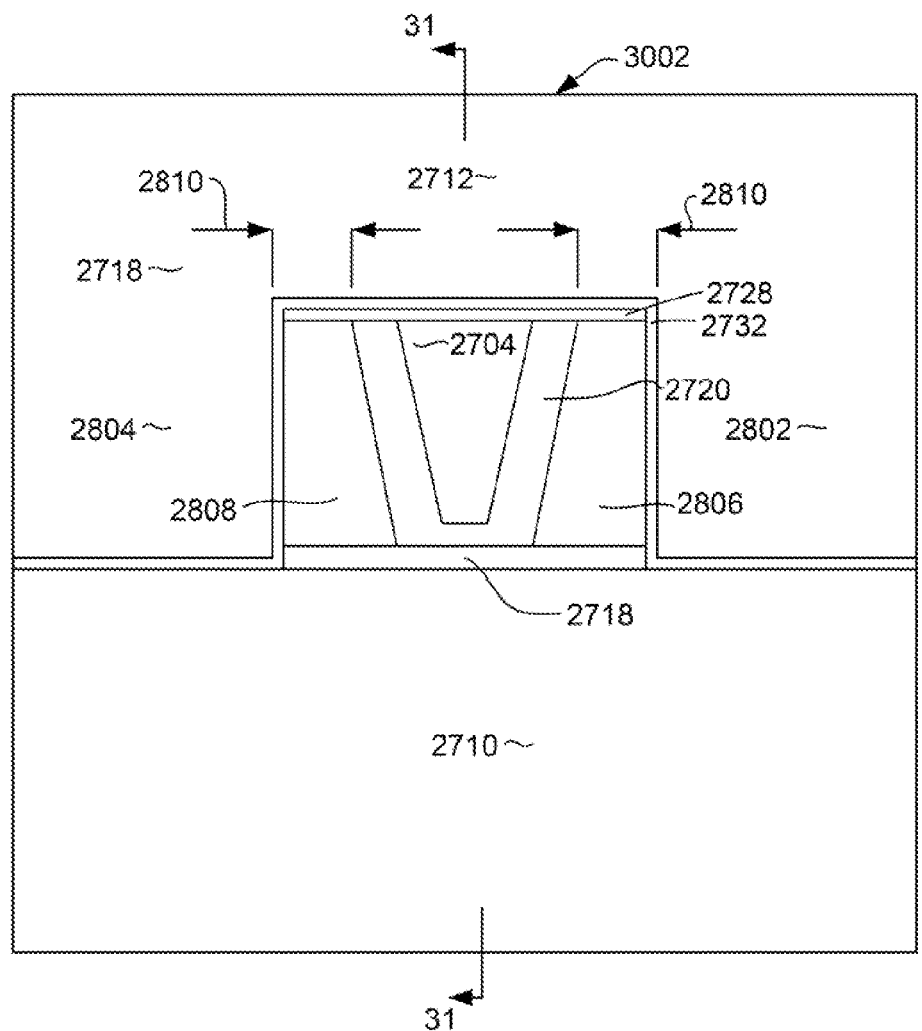
FIG. 30 is an ABS view of a write head according to still another embodiment of the invention.

With reference to FIG. 30, yet another embodiment of the invention 3002 has even greater magnetic connection between the trailing shield 2712 and the leading shield 2710. The non-magnetic layers 2718 and non-magnetic layer 2728 terminate at the outer edge of the non-magnetic side fill layers 2806, 2808. Therefore, since the layer 2728 is a high magnetic moment seed layer and is functionally part of the trailing shield 2712, the entire region of the shield 2712, 2710 that fall outside of the side gaps 2810 are magnetically connected.

Figure 31:
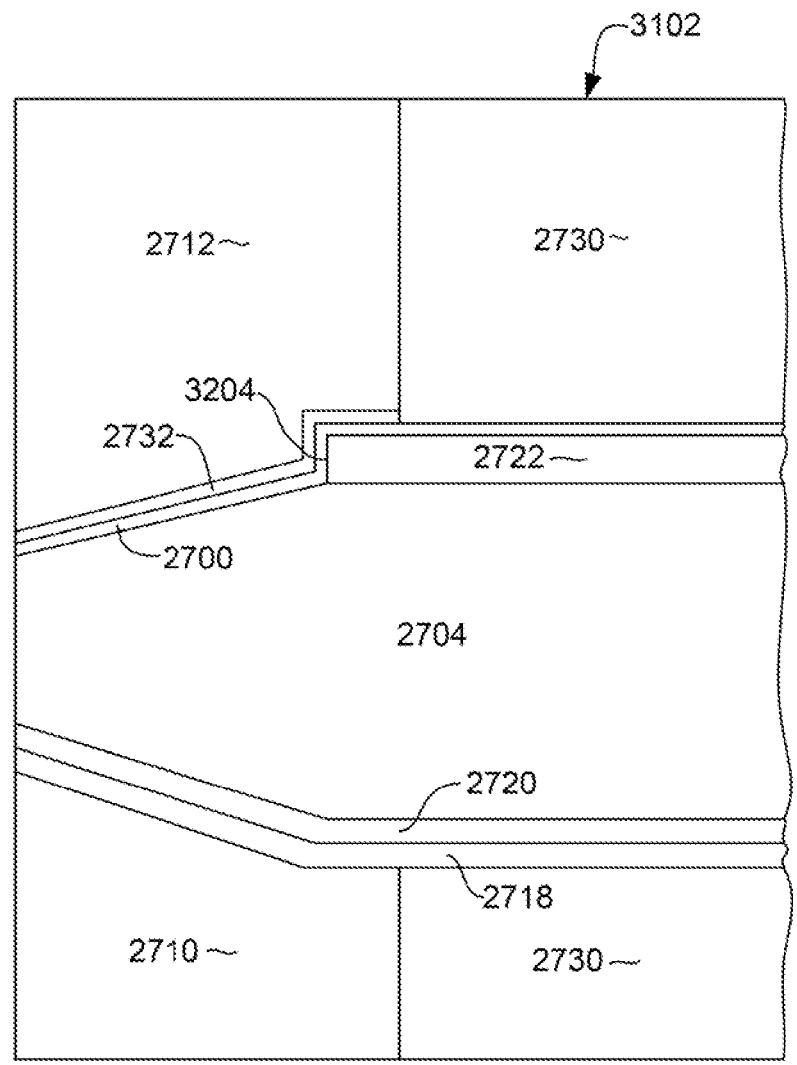
FIG. 31 is a side, cross sectional view the write head of FIG. 30 as seen from line 31-31 of FIG. 30.

FIG. 31 shows a side cross sectional view as seen from line 31-31 of FIG. 30 and shows another embodiment of the invention. FIG. 31 shows a write head 3102 that is similar to the write head 2702 of FIG. 27, except that the non-magnetic bump 2726 is removed. Therefore, the non-magnetic step layer 2722 provides an abrupt, stepped transition to a larger spacing between the write pole 2704 and the trailing magnetic shield 2712 at a location removed from the ABS.

Figure 32:
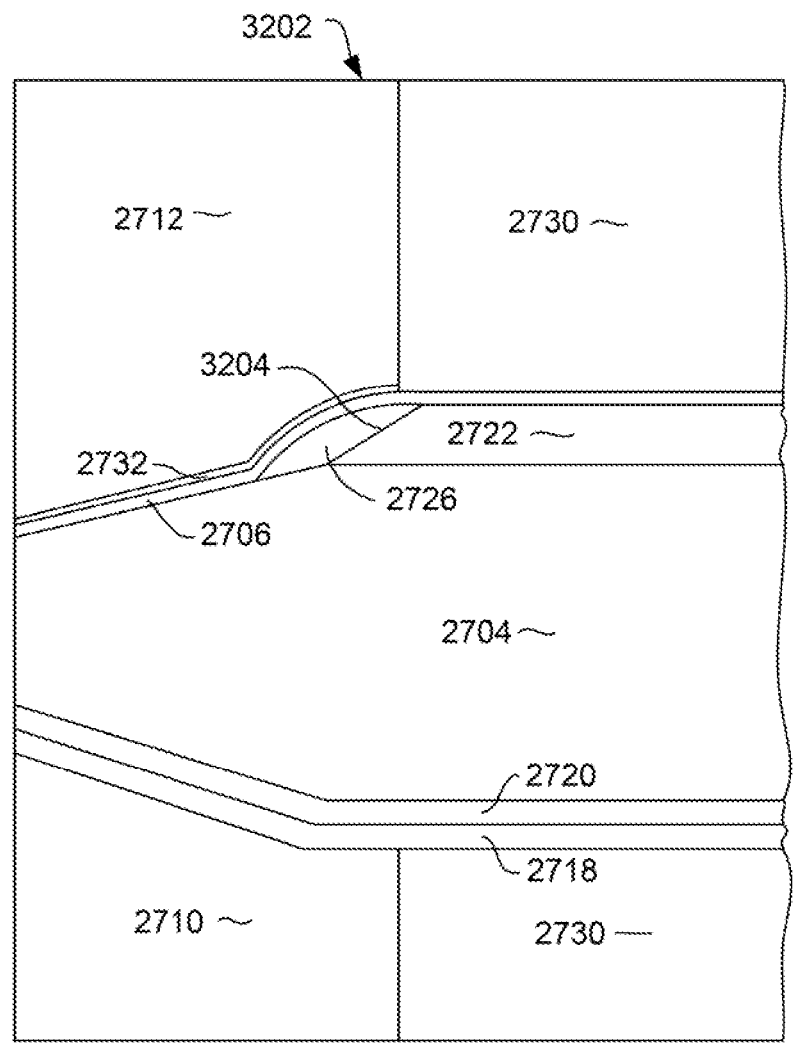
FIG. 32 is a side cross sectional view of a write head according to still another embodiment of the invention.

FIG. 32 shows a cross sectional view of yet another embodiment of the invention 3202. This embodiment is similar to that of FIGS. 27 and 31, except that the non-magnetic step layer 2722 is configured with a sloped front edge 3204 as well as a non-magnetic bump layer 2726. The sloped front edge 3204 provides an even more gentle spacing transition than that provided by the embodiment 2702 of FIG. 27.

Figure 33:
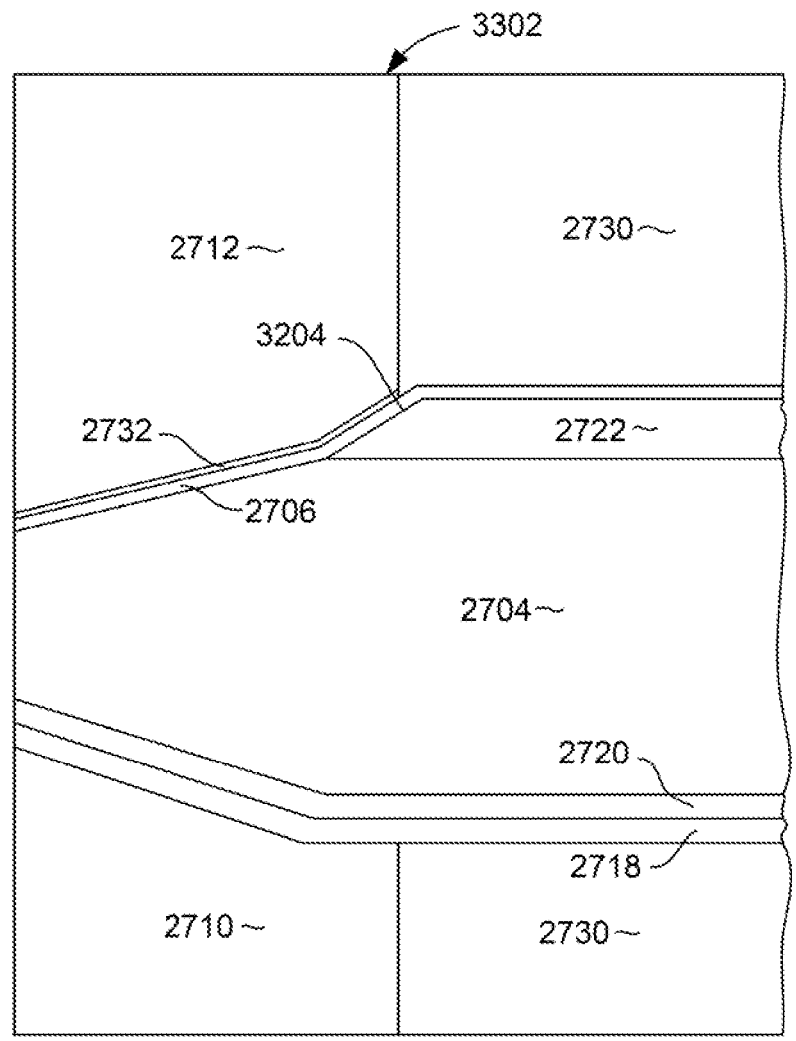
FIG. 33 is a side cross sectional view of a write head according to still another embodiment of the invention.

FIG. 33 shows a cross sectional view of still another embodiment of the invention 3302. In this embodiment, the non-magnetic bump 2726 (FIG. 27) is not included, but the non-magnetic step layer 2722 has a sloped front edge 3204. This allows the additional stepped spacing between the trailing shield 2712 and the write pole 1102 to be gradual without the need for the processing steps necessary for forming a non-magnetic bump such as is included in the embodiments of FIGS. 27 and 32.

Figure 34:
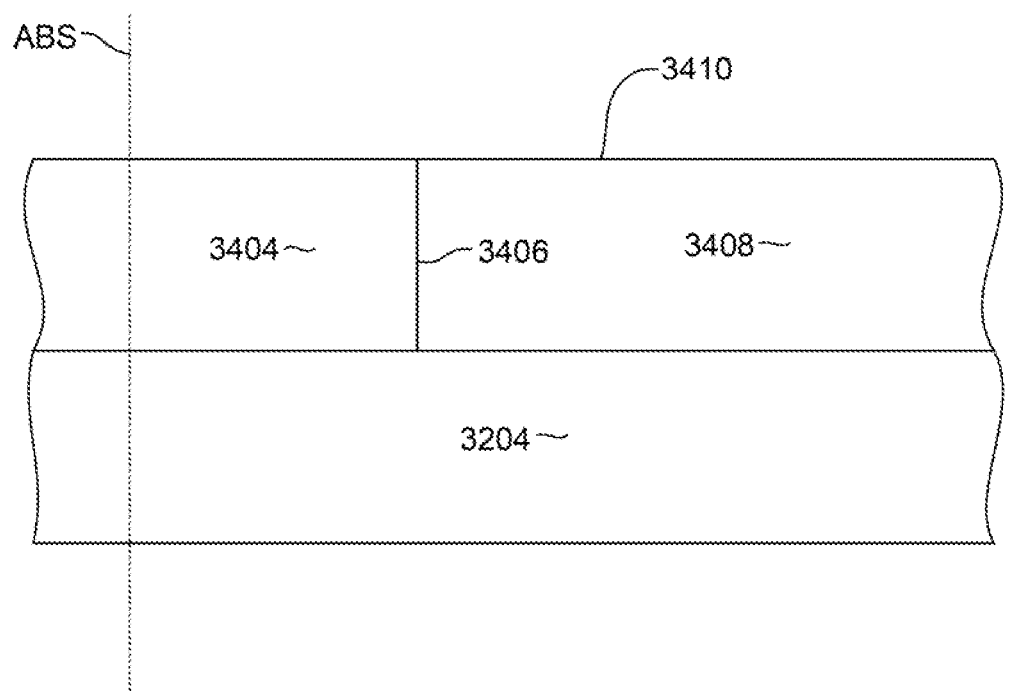
FIGS. 34-57 illustrate a write head in various intermediate stages of manufacture in order to illustrate a method of manufacturing a write head according to the various embodiments of FIGS. 27-33.

FIGS. 34 through 57 describe a method for manufacturing a magnetic write head according to the various embodiments described above with reference to FIGS. 27-33. With particular reference to FIG. 34, a substrate 3402 is provided. A magnetic leading shield structure 3404 constructed of a magnetic material such as NiFe is formed on the substrate, having a back edge 3406 that is located a desired distance from an air bearing surface plane (ABS). A non-magnetic fill layer such as alumina 3408 fills the space behind the leading shield structure 3404. The shield 3404 and non-magnetic fill layer 3408 preferably have co-planar upper surfaces 3410. The shield 3404 and fill layer 3408 can be constructed by various methods such as forming an electroplating frame mask, electroplating the shield layer, removing the electroplating frame mask, depositing a thick layer of alumina and performing a chemical mechanical polishing (CMP).

Figure 35:
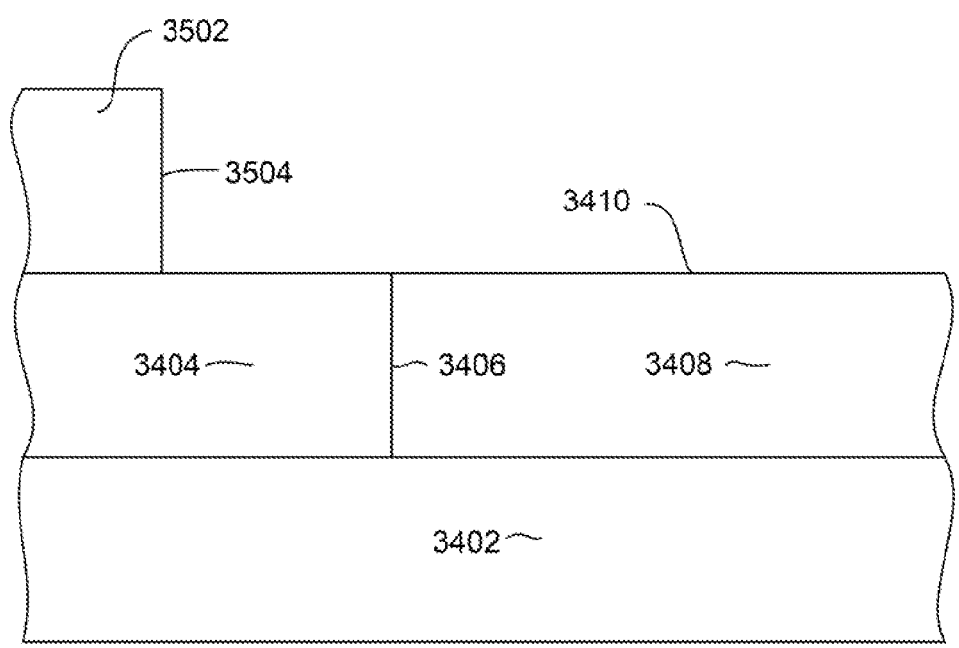
Figure 36:
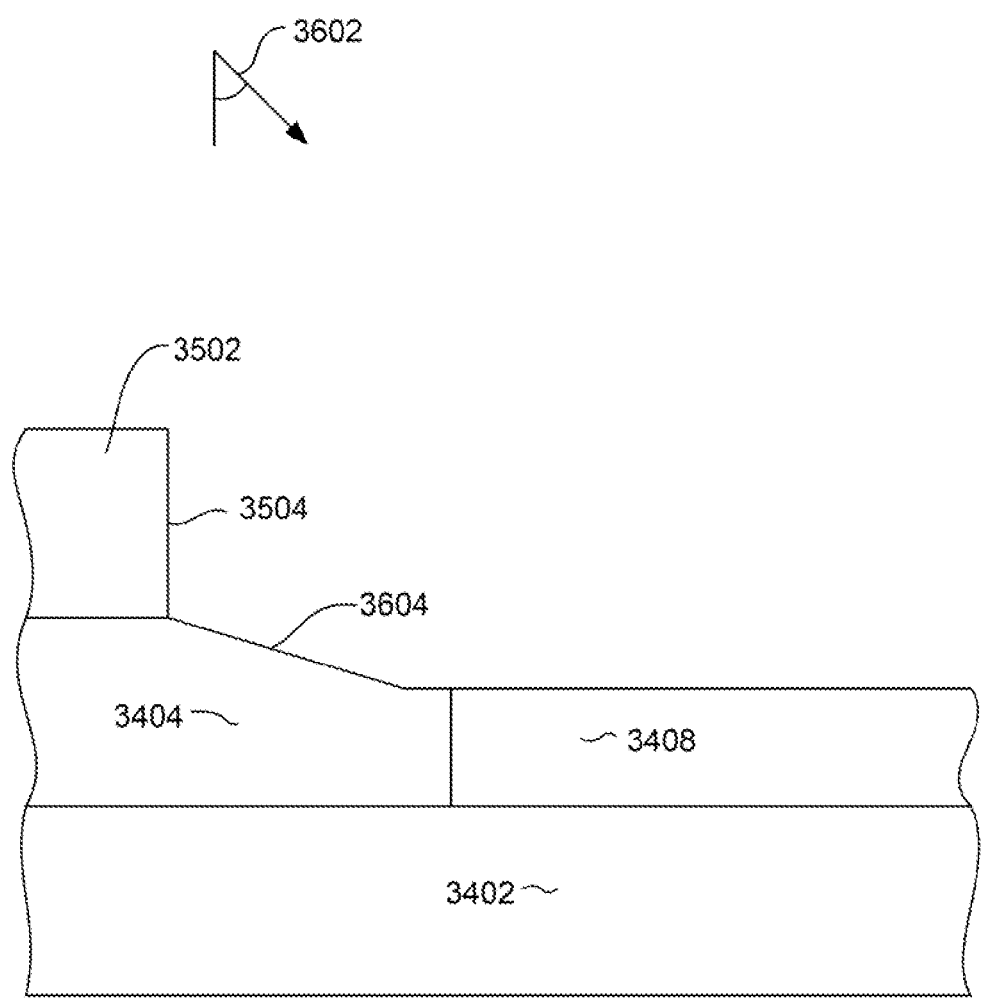

With reference now to FIG. 35, a mask 3502 is constructed having a back edge 3504 that is located so as to define the location of a beginning of a write pole leading edge taper. The mask 3502 can be constructed of a patterned photoresist. Then, an ion milling is performed to remove a portion of the layers 3404, 3408 that are not protected by the mask 3502, resulting in a structure as shown in FIG. 36. The ion milling is performed at one or more angles 3602 relative to normal so that shadowing from the mask 3502 allows the ion milling to form a tapered surface portion 3604 on the magnetic shield structure 3404.

Figure 37:
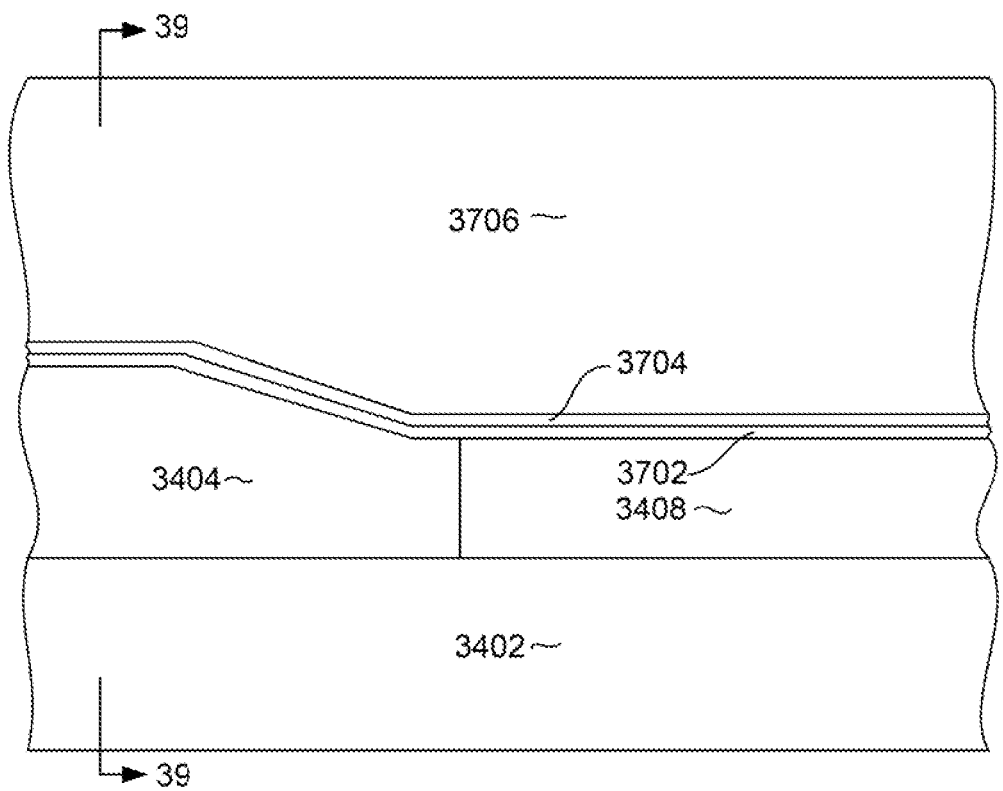
Figure 38:
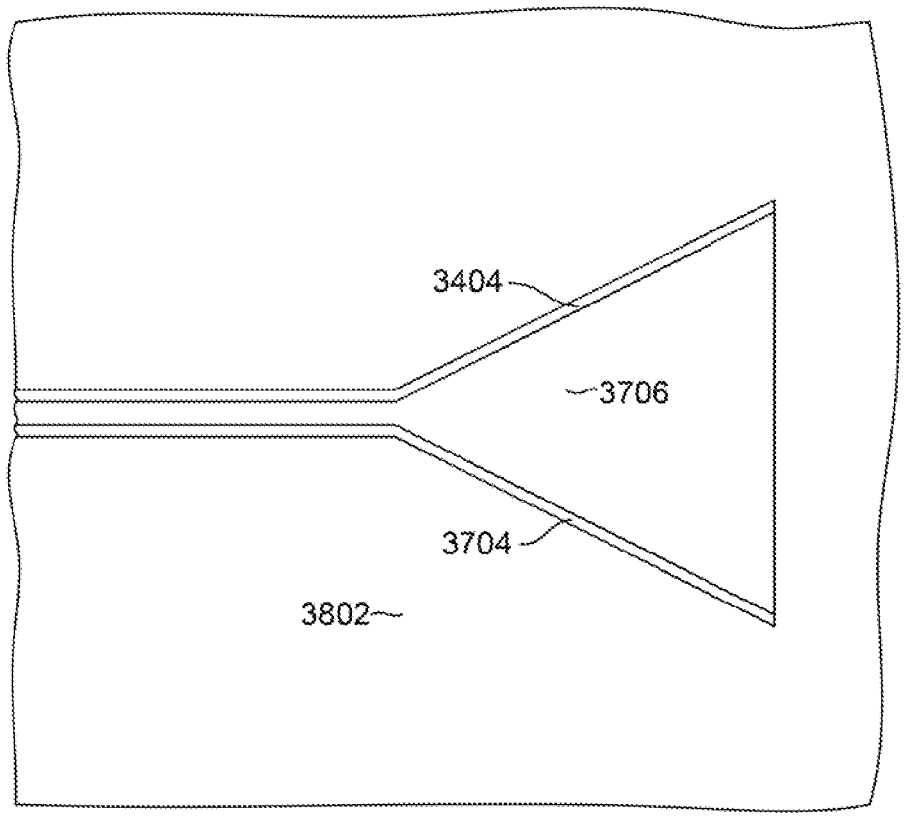
Figure 39:
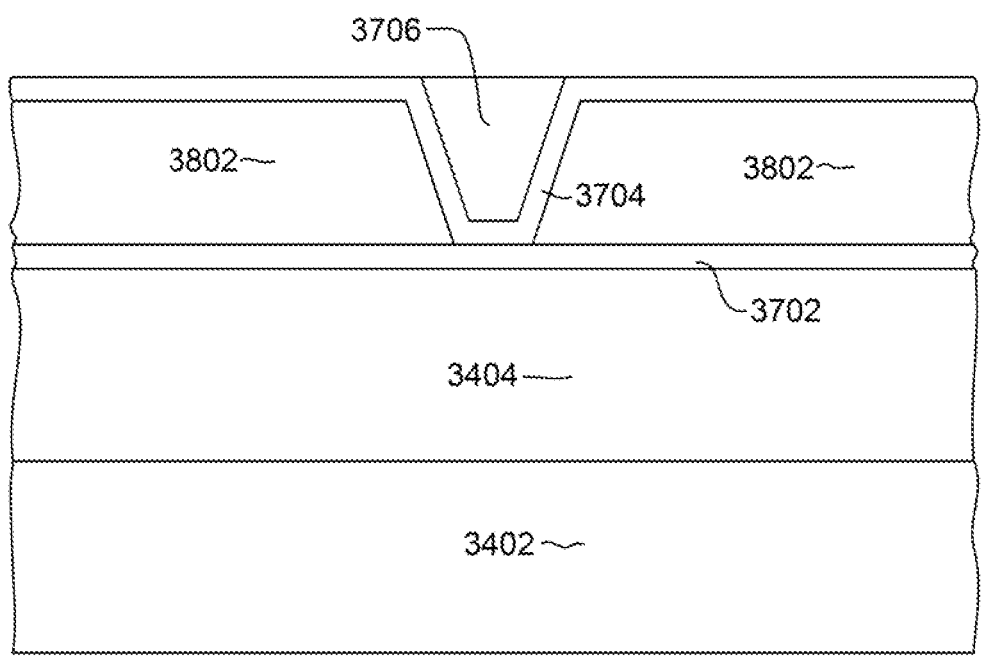
Figure 40:
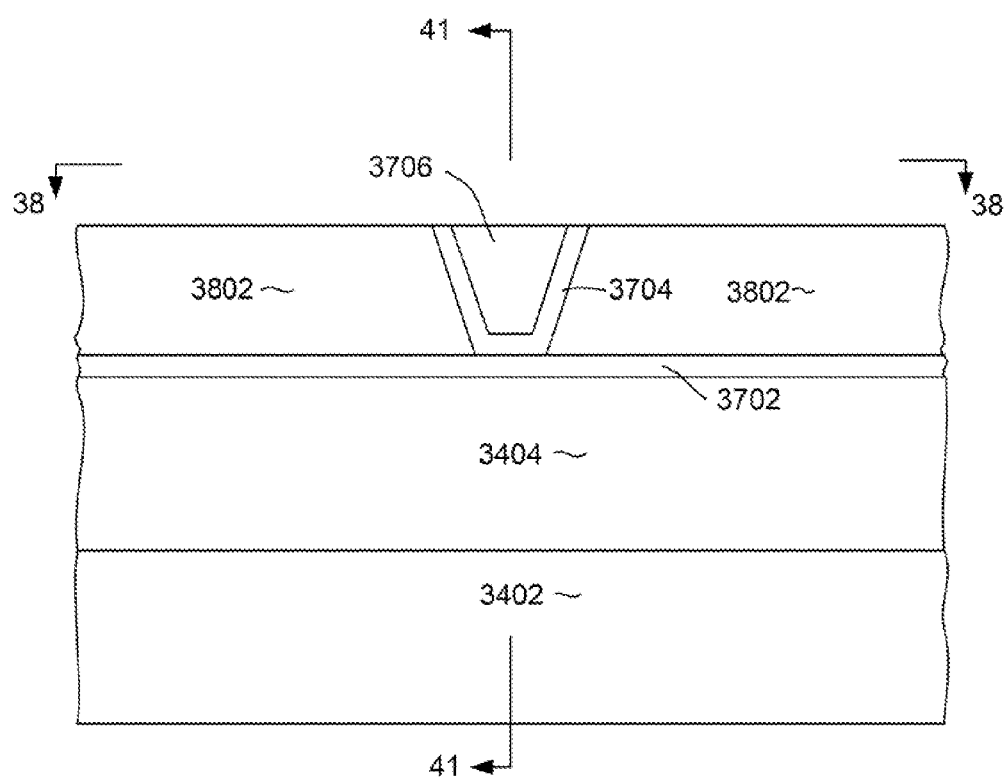

Then, with reference to FIG. 37, a non-magnetic RIE stop layer 3702 is deposited over the layers 3404, 3408. A magnetic write pole is then formed over the RIE stop layer 3702 by methods such as those described with reference to FIGS. 5-12. FIG. 38 shows a top down view of the write pole 3706 with non-magnetic side layers 3404. FIG. 39 shows a view of a plane that is parallel with the air bearing surface, as taken from line 39-39 of FIG. 37. As can be seen, the Ru layer 3704 extends up the side walls and over the top of a RIEable fill layer 3802. An ion milling can be performed to remove portions of the Ru layer 3704 that extend over the RIEable fill layer, resulting in a structure as shown in FIG. 40. FIG. 38 shows a top down view of the structure of FIG. 40, as viewed from line 38-38 of FIG. 40. As can be seen, the Ru layer 3704 forms side walls all along the sides of the write pole 3706, the Ru layer 3704 being surrounded by the RIEable fill layer 3802.

Figure 41:
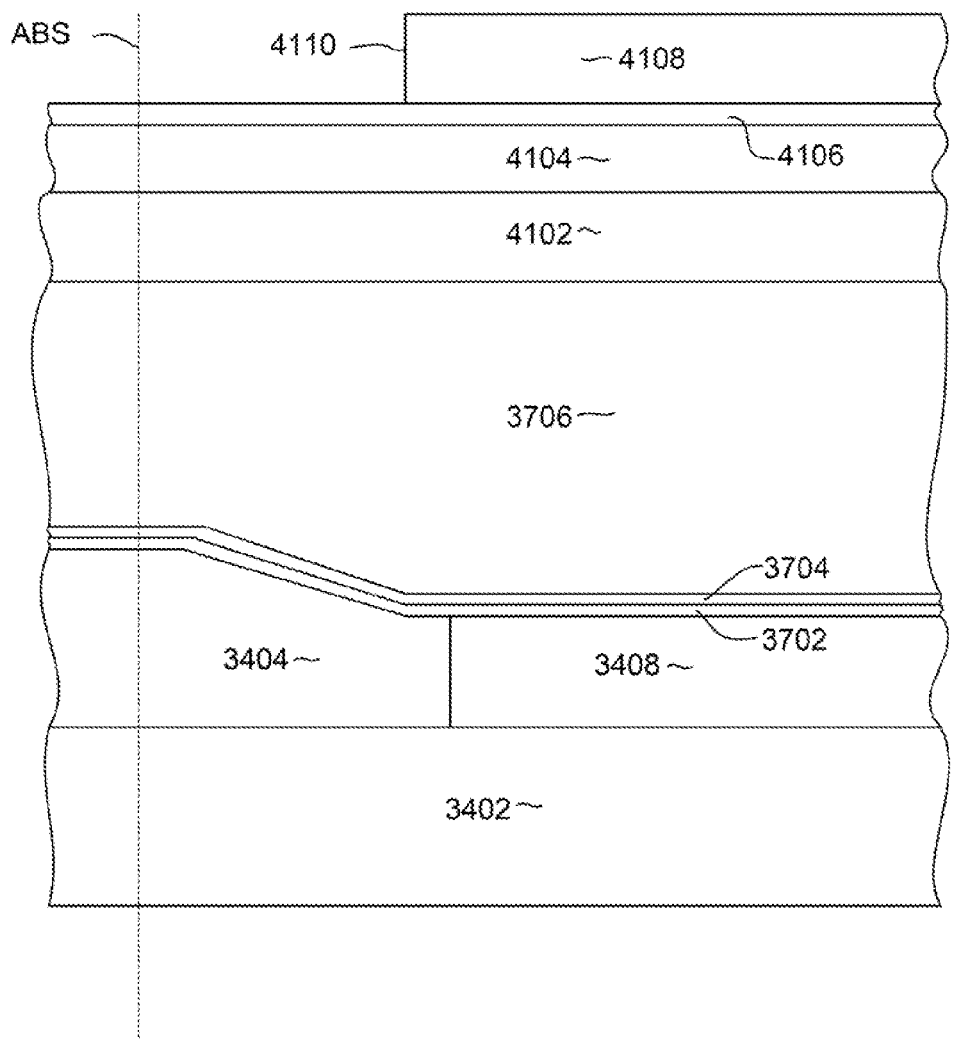

FIG. 41 shows a side cross sectional view as taken from line 41-41 of FIG. 40. With reference to FIG. 41, a non-magnetic step layer 4102, preferably constructed of NiCr is deposited over the write pole 3706, Ru layer 3704 and RIEable fill layer 3802 (FIG. 40). A milling mask 4104 is then deposited over the non-magnetic step layer 4102. The milling mask 4104 is preferably constructed of SiC or alumina ($Al_2O_3$). A thinner RIE mask 4106 is then deposited over the milling mask 4104. The RIE mask can be constructed of a material such as Cr. A photoresist mask 4108 is then formed over the RIE mask 4106. The photoresist mask 4108 can be formed by depositing a full film layer of photoresist and then photolithographically patterning and developing the photoresist layer to form a mask 4108 having a front edge 4110 that is located at a desired distance from an air bearing surface plane ABS and located a desired distance relative to a flare point of the write head 3706 (not shown in FIG. 41).

Figure 42:
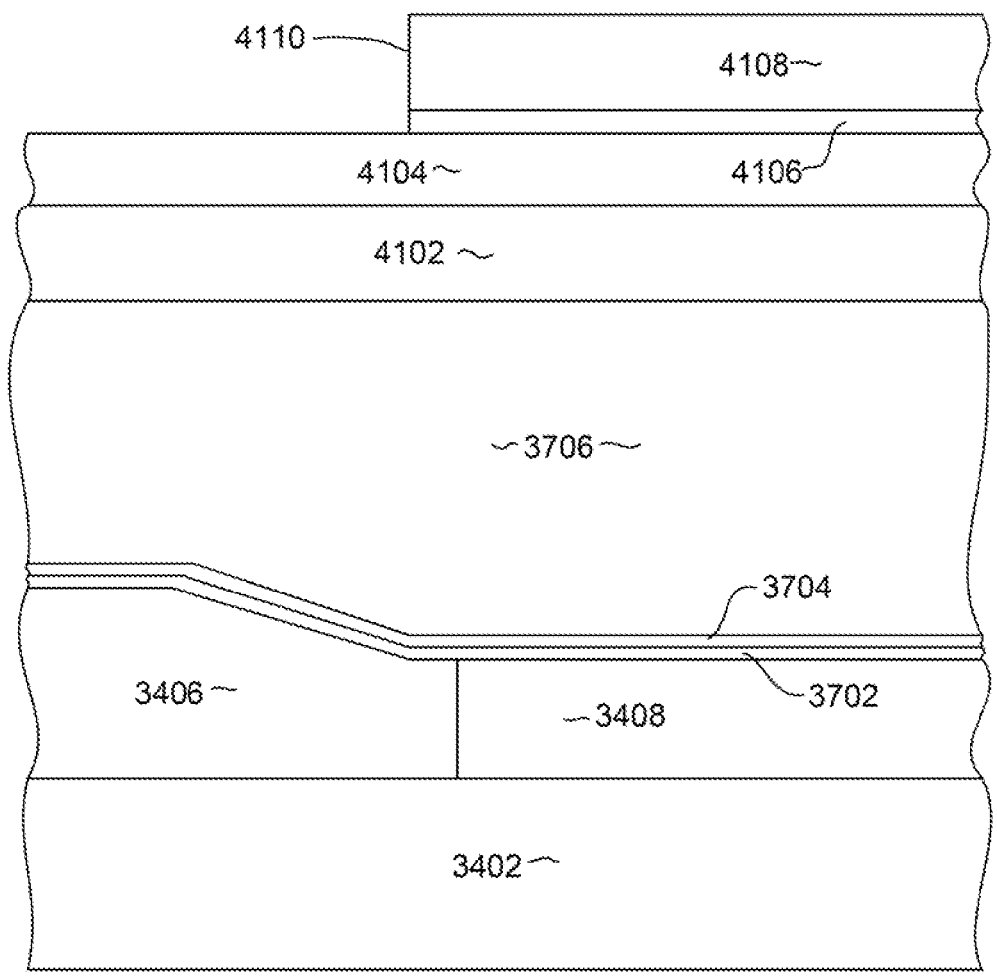
Figure 43:
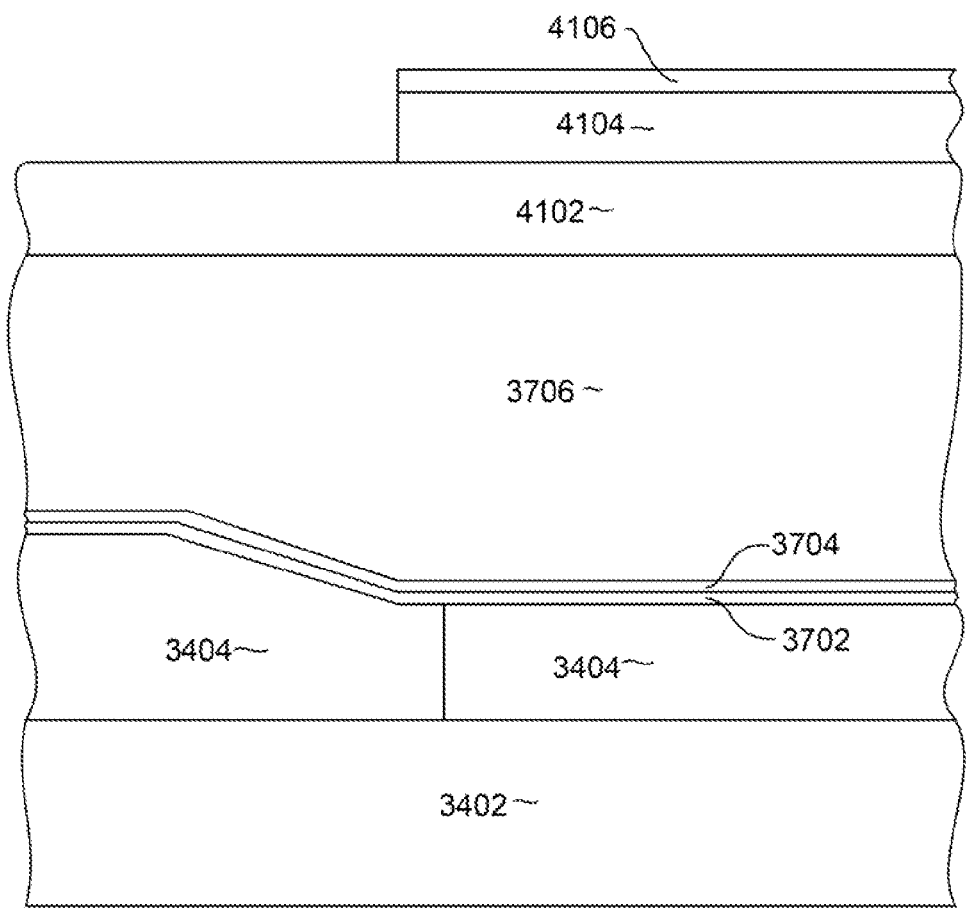

With reference now to FIG. 42, a quick ion milling is performed to transfer the image of the photoresist mask 4108 onto the underlying RIE mask 4106, resulting in a structure as shown in FIG. 42. Then, a reactive ion etching is performed to transfer the image of the RIE mask 4106 onto the underlying milling mask 4104. The resist mask 4108 can also be stripped off, leaving a structure as shown in FIG. 43.

Figure 44:
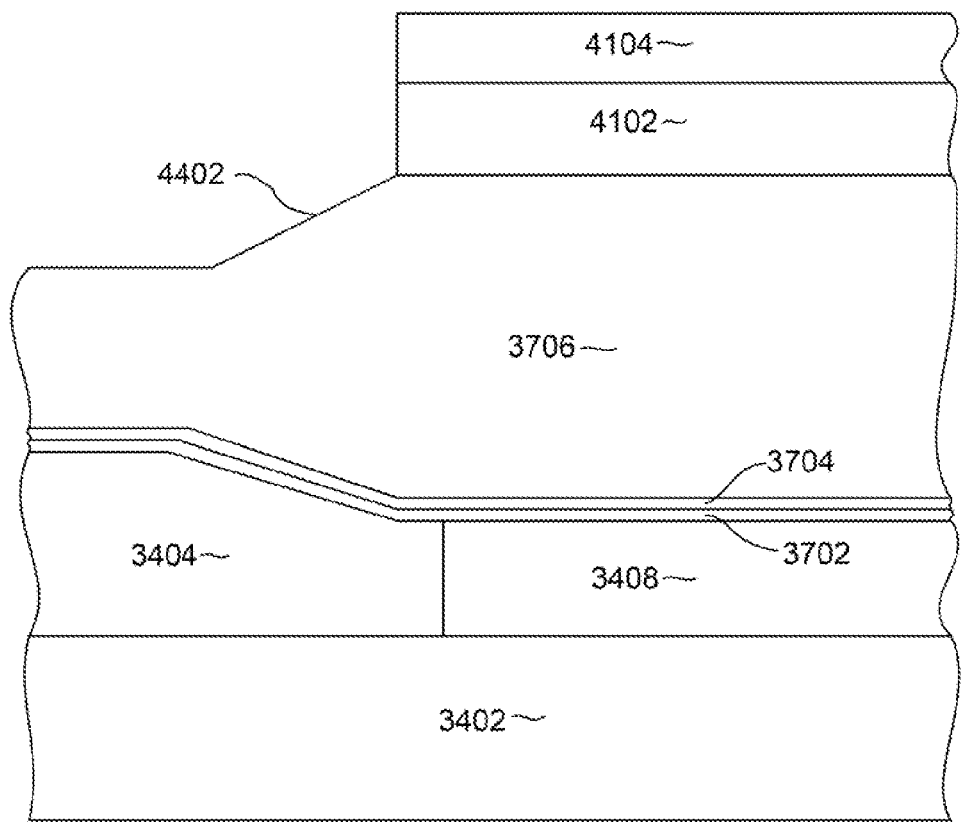
Figure 45:
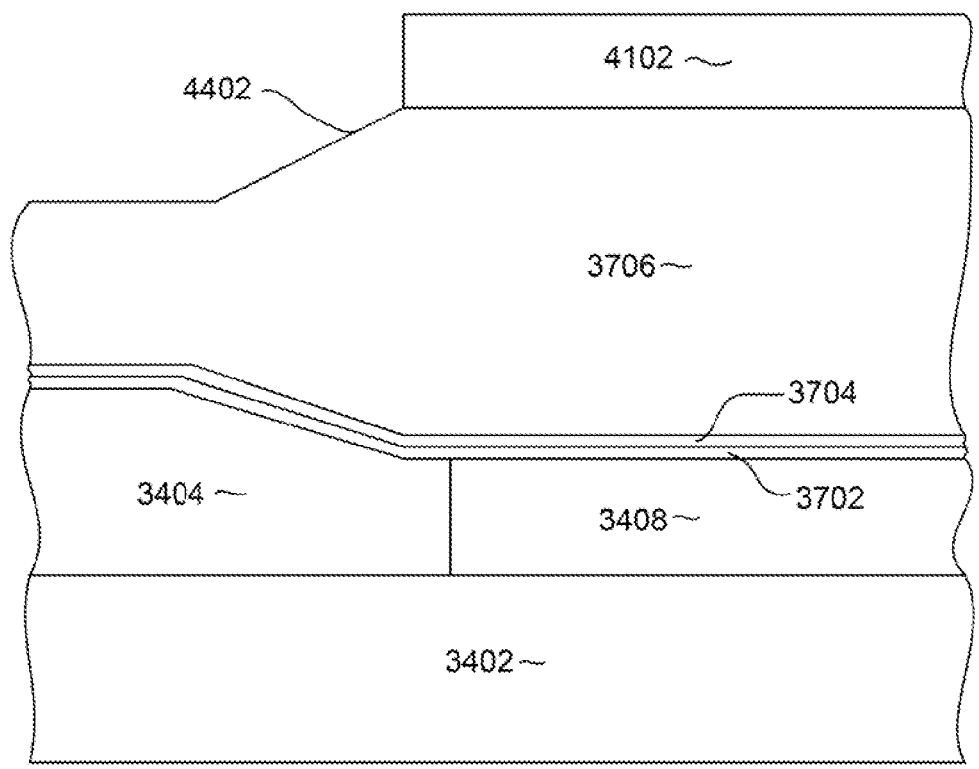

Then, an ion milling can be performed to remove unprotected portions of the layer 4102 and also to remove a portion of the write pole material 3706 to form a tapered trailing edge portion 4402 on the write pole, as shown in FIG. 44. The ion milling can be performed at an angle or plurality of angles relative to normal so that shadowing from the layers 4102, 4104 allows the ion milling to form the tapered surface 4402 with a desired taper angle, preferably about 25 degrees relative to horizontal. The remaining milling mask 4104 can be removed (if any remains after ion milling), such as by ion milling in an appropriate chemistry, leaving a structure as shown in FIG. 45.

Figure 46:
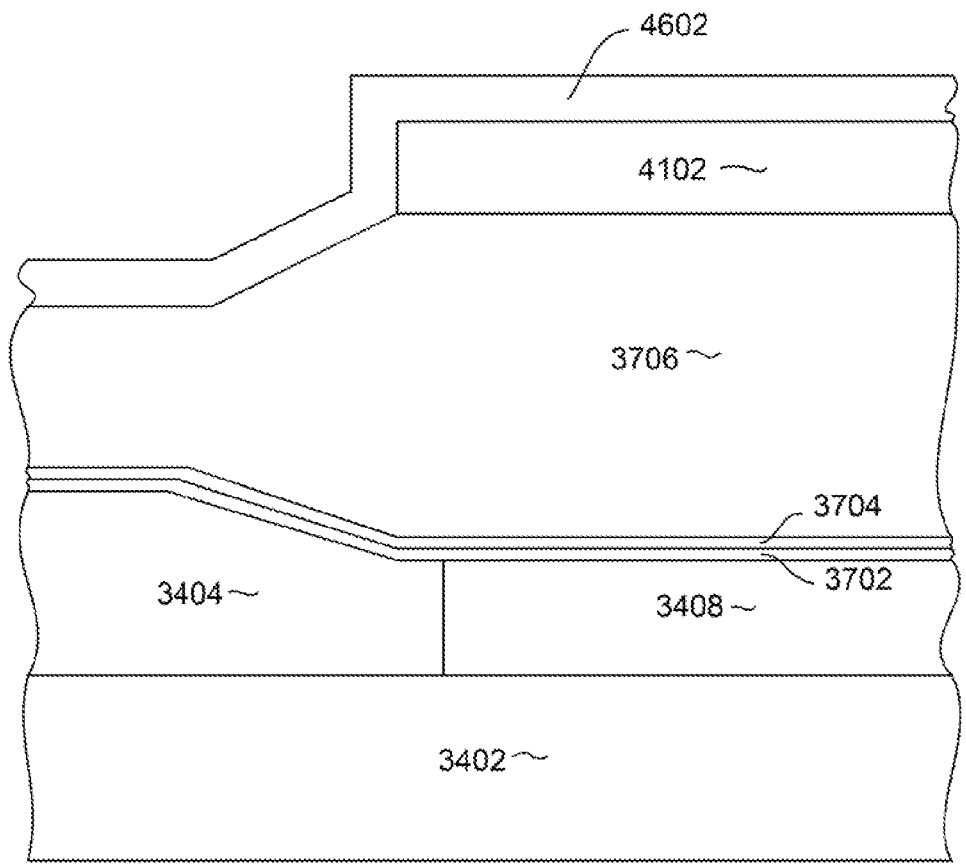

Now, with reference to FIG. 46 a layer of alumina 4602 is deposited. The alumina layer 4602 is preferably deposited by a conformal deposition process such as atomic layer deposition or chemical vapor deposition. Then, an ion milling is performed to preferentially remove horizontally disposed portions of the alumina layer, leaving an alumina bump at the front edge of the non-magnetic step layer 4102 as shown in FIG. 47.

Figure 48:
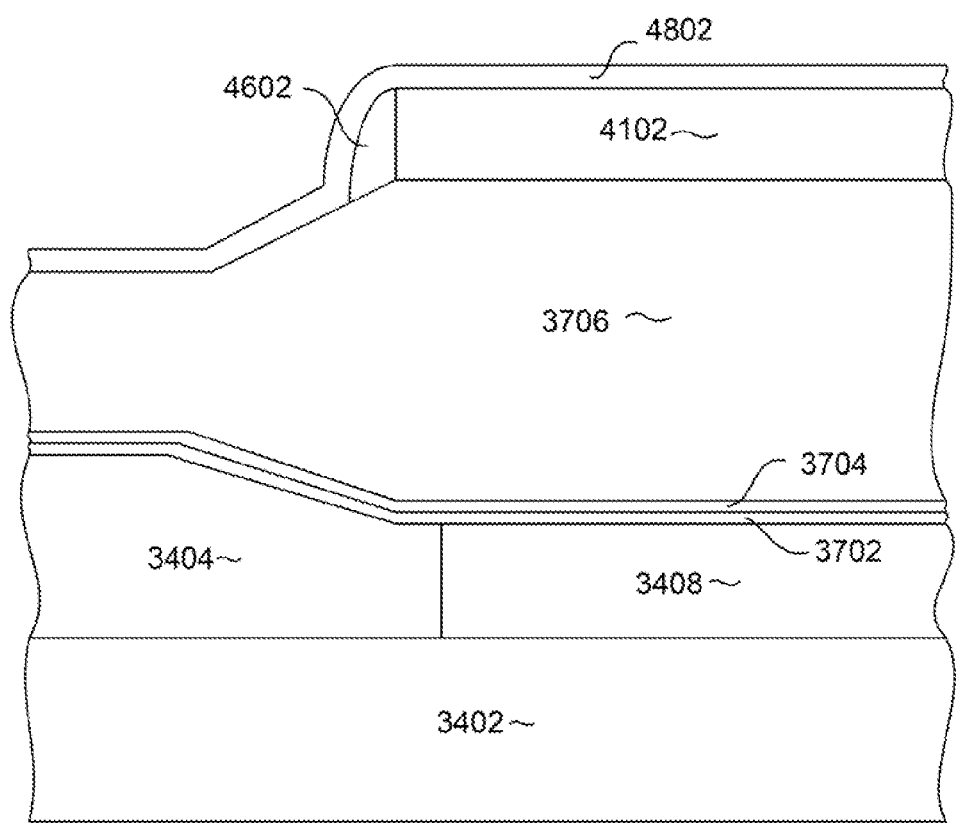

With reference to FIG. 48, a layer of non-magnetic material 4802 is deposited to a thickness to define a desired trailing gap thickness. The trailing gap layer 4802 can be constructed of Ru.

Figure 47:
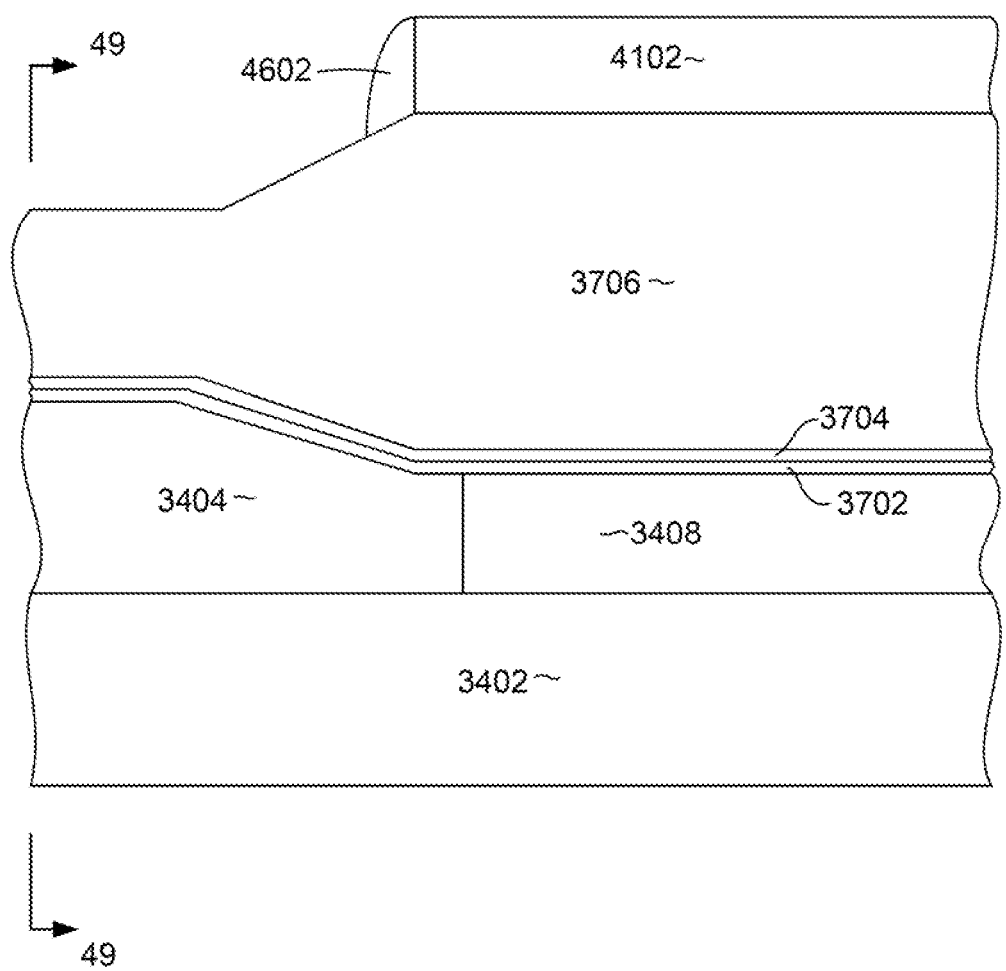
Figure 49:
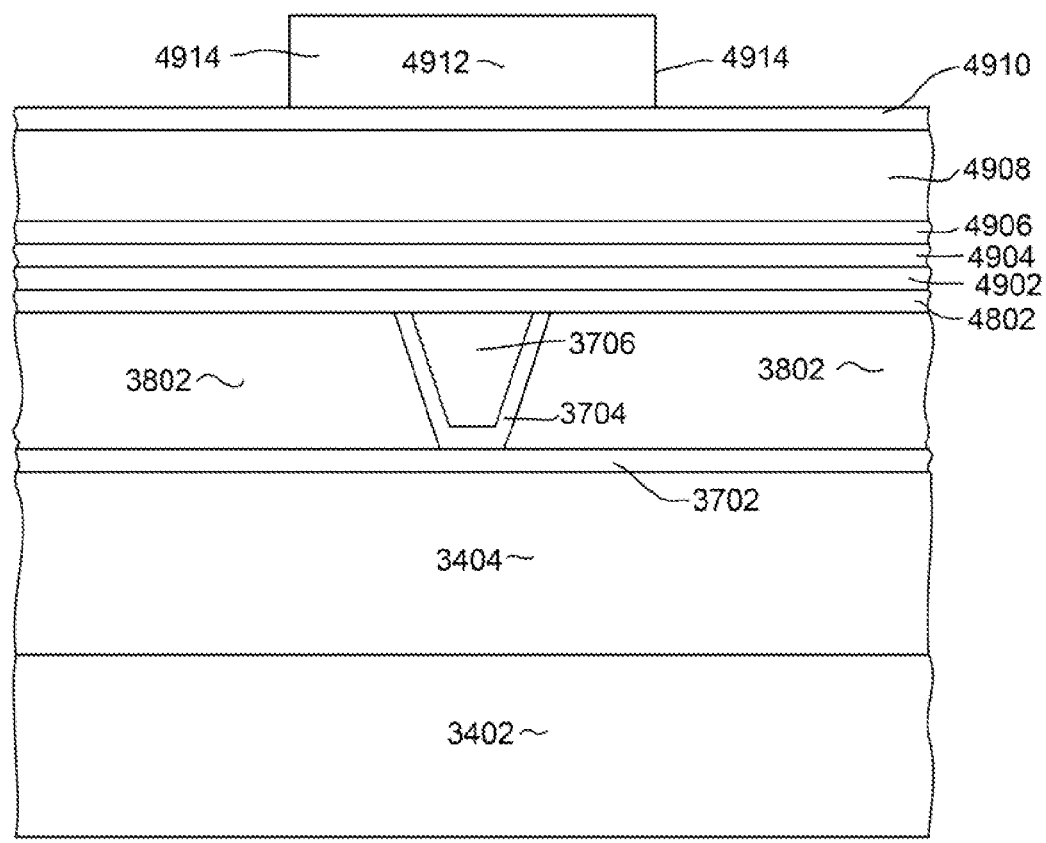

FIG. 49 shows a cross sectional view of a plane that is parallel with the air bearing surface as taken from line 49-49 of FIG. 47. The non-magnetic bump 4602 and step layer 4102 are not shown in FIG. 47, because they are hidden into the plane of the page. A hot seed layer 4902 is deposited onto the non-magnetic gap layer. This hot seed layer 4902 can a high magnetic moment, high Bsat material such as CoFe. A hard mask layer, preferably diamond like carbon (DLC) 4904 is then deposited onto the hot seed layer 4902. An etch mask 4906 is then deposited onto the DLC hard mask layer 4904. An image transfer layer 4908 is deposited over the etch mask 4906. The image transfer layer 4908 can be a soluble polymer such as DURAMIDE®. A second hard mask, preferably constructed of SiO$_2$ or Si 4910 is then deposited over the image transfer layer 4908. A photoresist mask 4912 is then formed over the second hard mask layer 4910. The photoresist mask is formed to have first and second sides 4914 that are separated by a width that will define a desired side gap thickness (as will become apparent below).

Figure 50:
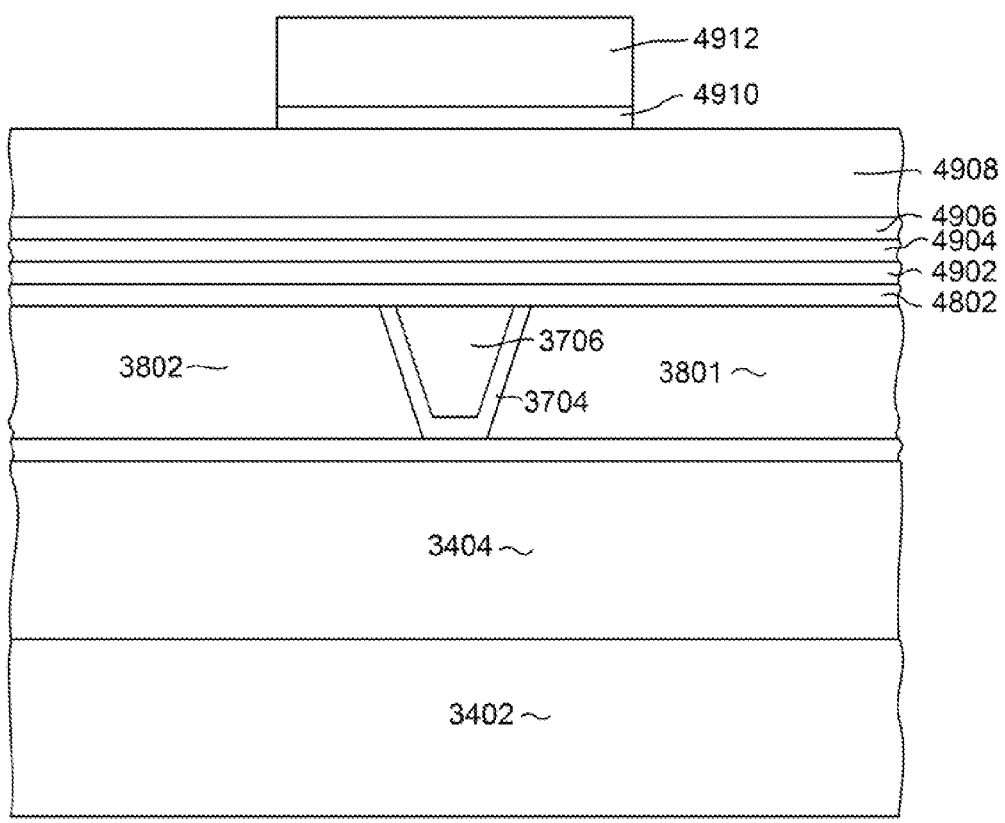
Figure 51:
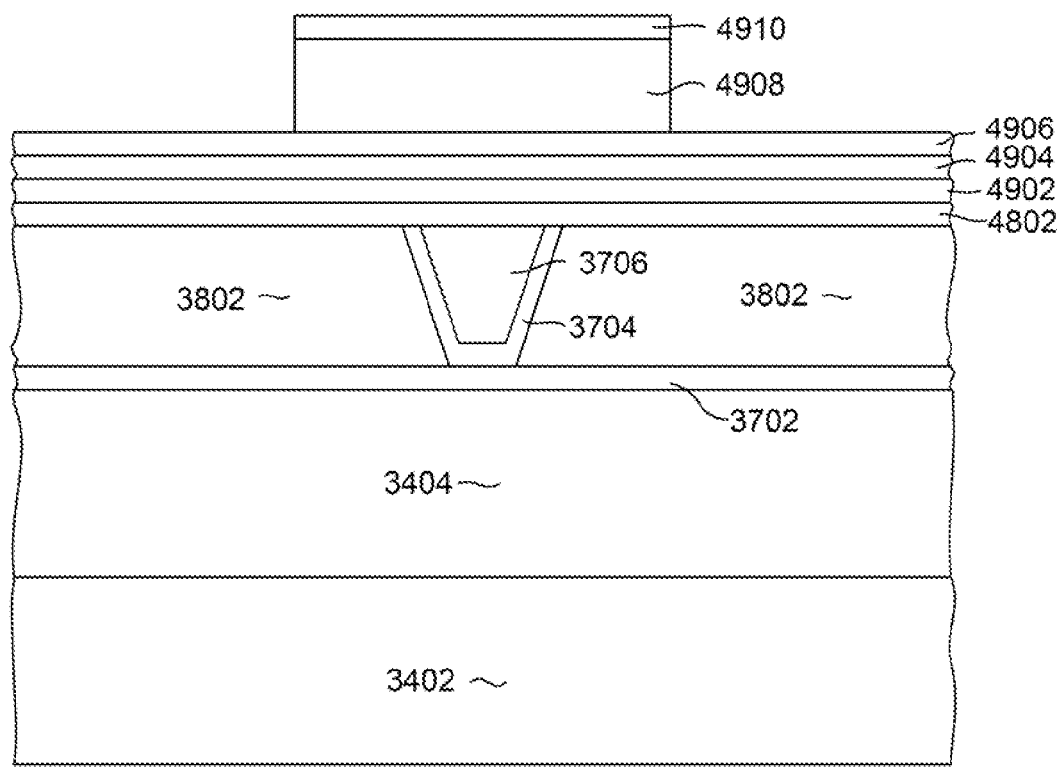

With reference now to FIG. 50, a first reactive ion etching is performed to remove portions of the second hard mask 4910 that are not protected by the photoresist mask 4912, thereby transferring the image of the photoresist mask 4912 onto the second hard mask 4910. Then, a second reactive ion etching is performed to transfer the image of the second hard mask 4910 onto the image transfer layer 4908, resulting in a structure as shown in FIG. 51. The first and second reactive ion etchings are each performed in a chemistry that is chosen to selectively remove the material of interest (ie. 4910 for the first RIE and 4908 for the second RIE).

Figure 52:
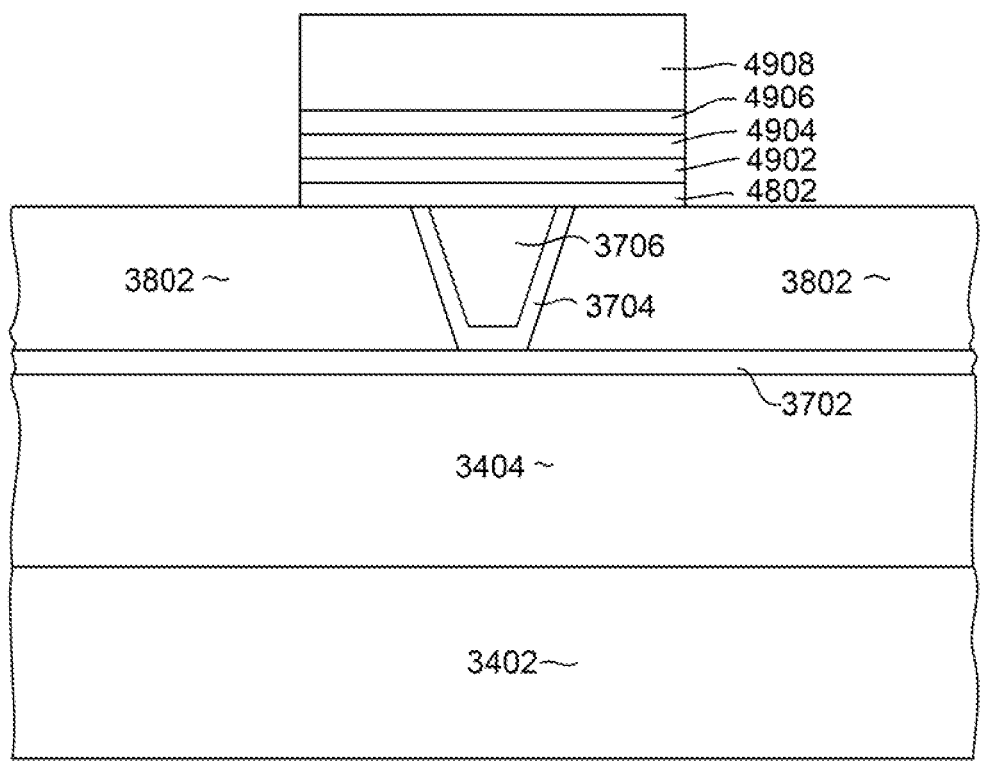

An ion milling is then performed to remove portions of the layers 4802, 4902, 4904, 4906 that are not protected by the image transfer layer 4908 and second hard mask 4910, leaving a structure as shown in FIG. 52. The layer 4910 may be removed in the process.

Figure 53:
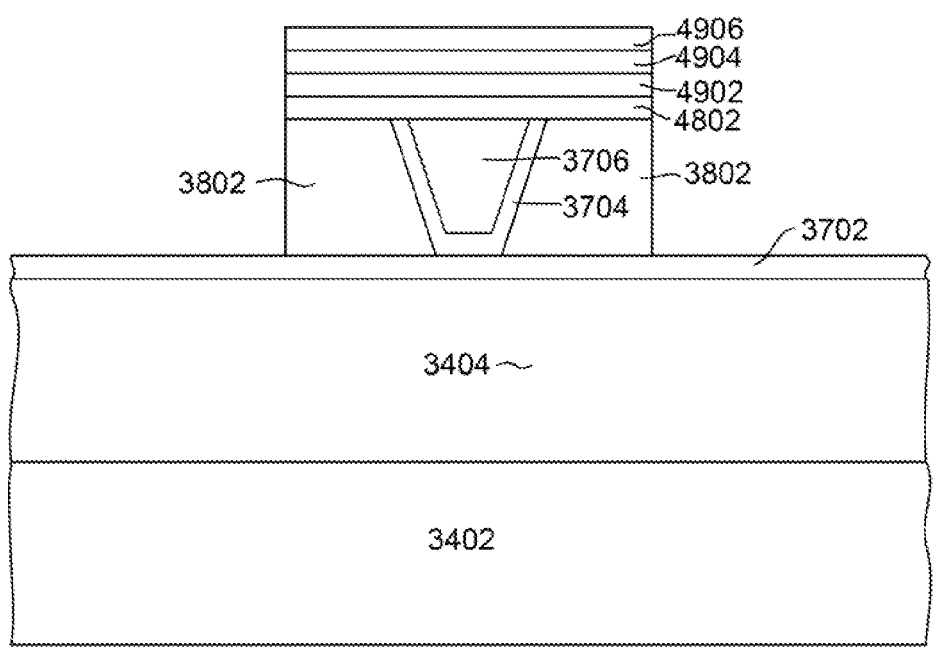
Figure 54:
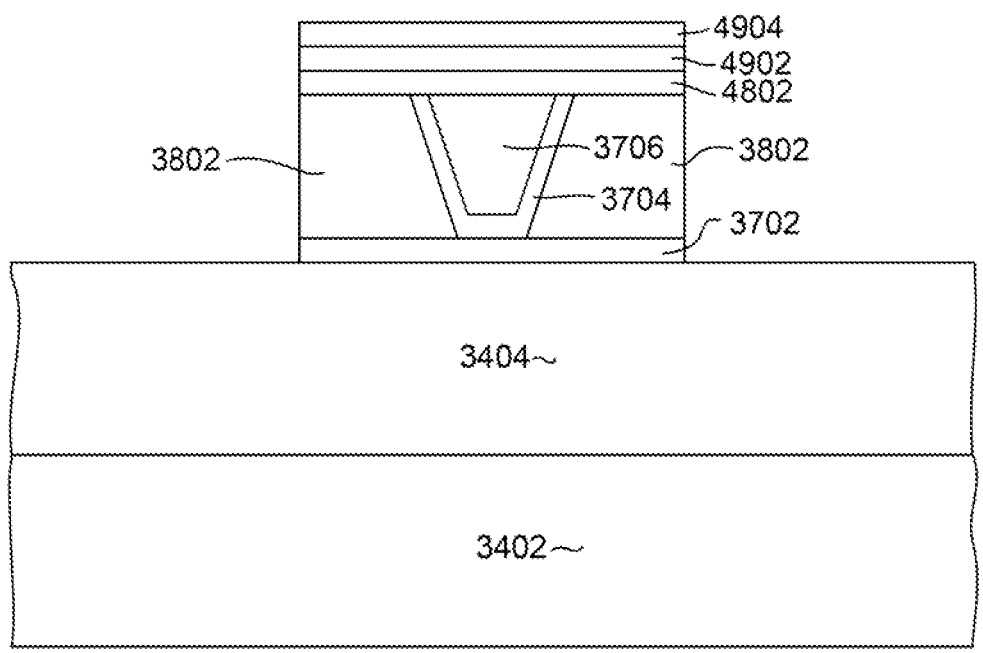
Figure 55:
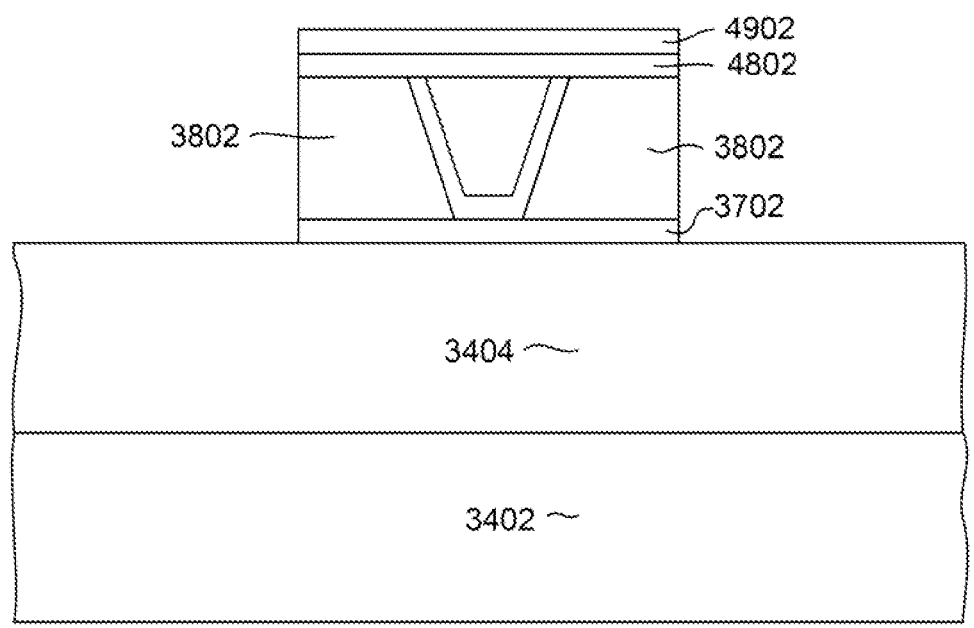

Now with reference to FIG. 53, a reactive ion etching is performed to remove portions of the RIEable fill layer 3802 that are not protected by the layers 4802, 4902, 4904, 4906. The RIE stops at the RIE stop layer 3702. A quick ion milling can be performed to remove the RIE stop layer 3702, leaving a structure as shown in FIG. 54. It should be pointed out, that if it is desired that a trailing shield be constructed that is not connected with the leading edge 3404 (as shown in FIG. 28), the RIE stop layer 3702 can be left intact. Then, the first hard mask layer 4904 can be stripped away such as by reactive ion etching using an O$_2$ plasma, leaving a structure as shown in FIG. 55.

Figure 56:
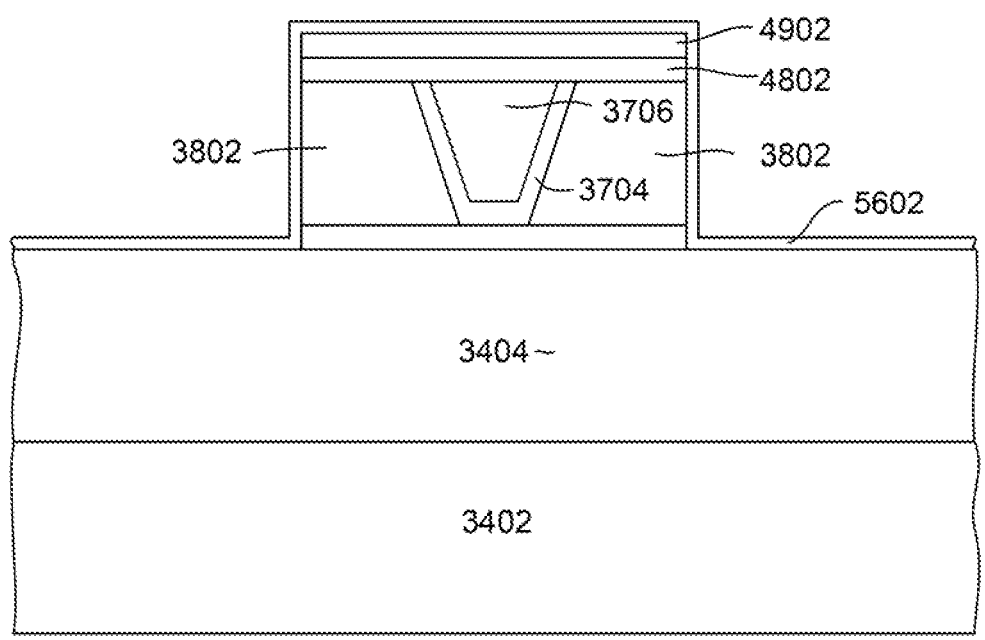
Figure 57:
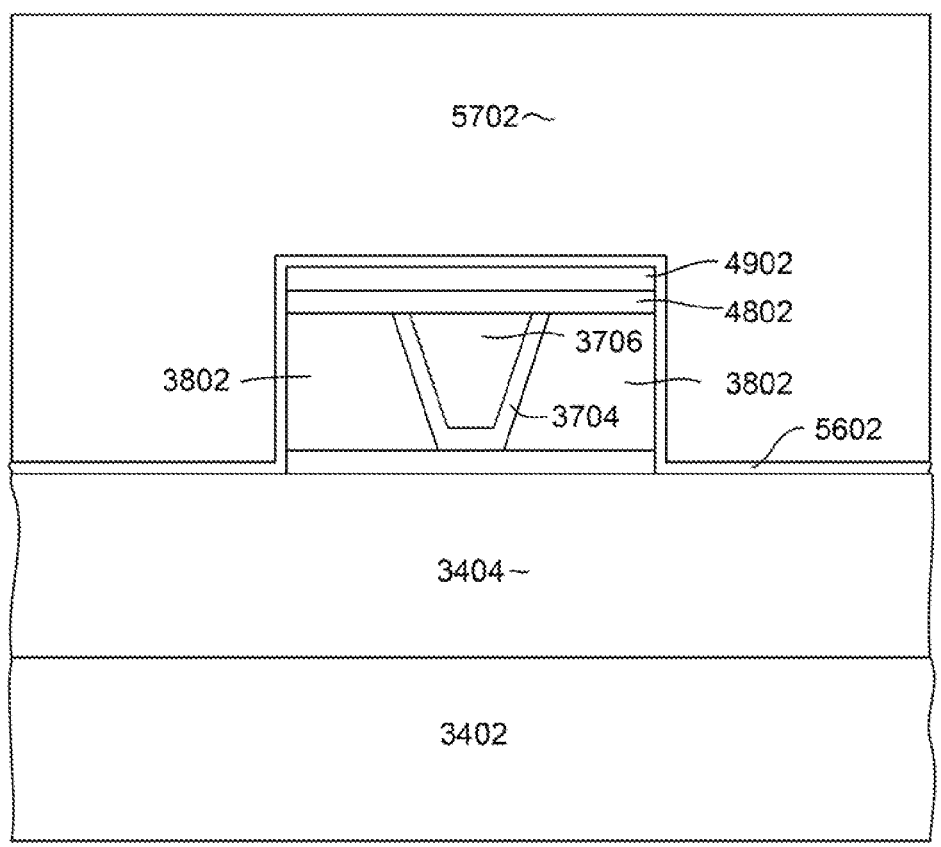

An electrically conductive, magnetic seed layer (such as NiFe) 5602 can then be deposited as shown in FIG. 56. Then, with reference to FIG. 57 a wrap around trailing magnetic shield 5702 can be formed by first constructing a photoresist electroplating frame mask (not shown) and then electroplating a magnetic material such as NiFe onto the seed layer 5602.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
    a magnetic write pole having a tapered trailing edge portion near an air bearing surface and a non-tapered trailing edge portion that is removed from the air bearing surface;
    a thin non-magnetic layer formed on the write pole only in the non-tapered trailing edge portion;
    a magnetic layer formed over the thin non-magnetic layer;
    a non-magnetic gap layer formed on the tapered trailing edge portion of the write pole and also on the magnetic layer, such that the non-magnetic layer is between the non-magnetic gap layer and the write pole;
    a magnetic trailing shield formed over the non-magnetic gap layer; and
    a non-magnetic spacer layer formed over the magnetic layer and disposed between the magnetic layer and the non-magnetic gap layer.

2. The magnetic write head as in claim 1 wherein the non-magnetic spacer layer comprises NiCr.

3. The magnetic write head as in claim 1 wherein the non-magnetic spacer layer comprises NiCr and has a thickness of 40-60 nm.

4. A magnetic write head, comprising:
    a magnetic write pole having a tapered trailing edge portion near an air bearing surface and a non-tapered trailing edge portion that is removed from the air bearing surface;
    a thin non-magnetic layer formed on the write pole only in the non-tapered trailing edge portion;
    a magnetic layer formed over the thin non-magnetic layer;
    a non-magnetic gap layer formed on the tapered trailing edge portion of the write pole and also on the magnetic layer, such that the non-magnetic layer is between the non-magnetic gap layer and the write pole; and
    a magnetic trailing shield formed over the non-magnetic gap layer;
    wherein the magnetic layer comprises a lamination of magnetic layers separated by thin non-magnetic layers.

5. A magnetic write head, comprising:
    a magnetic write pole having a tapered trailing edge portion near an air bearing surface and a non-tapered trailing edge portion that is removed from the air bearing surface;
    a thin non-magnetic layer formed on the write pole only in the non-tapered trailing edge portion;
    a magnetic layer formed over the thin non-magnetic layer;
    a non-magnetic gap layer formed on the tapered trailing edge portion of the write pole and also on the magnetic layer, such that the non-magnetic layer is between the non-magnetic gap layer and the write pole; and a magnetic trailing shield formed over the non-magnetic gap layer;

wherein the magnetic layer comprises a lamination of magnetic layers separated by thin non-magnetic layers and the write pole comprises a single layer of magnetic material.

6. A magnetic write head, comprising:

a magnetic write pole having a tapered trailing edge portion near an air bearing surface and a non-tapered trailing edge portion that is removed from the air bearing surface;

a thin non-magnetic layer formed on the write pole only in the non-tapered trailing edge portion;

a magnetic layer formed over the thin non-magnetic layer;

a non-magnetic gap layer formed on the tapered trailing edge portion of the write pole and also on the magnetic layer, such that the non-magnetic layer is between the non-magnetic gap layer and the write pole; and a magnetic trailing shield formed over the non-magnetic gap layer;

wherein the thin non-magnetic layer comprises TaO or $SiO_2$ and wherein the thin non-magnetic layer is sufficiently thin to allow efficient magnetostatic coupling between the write pole and the magnetic layer.

* * * * *